United States Patent
Marchand et al.

(10) Patent No.: US 9,321,973 B2
(45) Date of Patent: Apr. 26, 2016

(54) PROCESS FOR THE HYDROCRACKING OF HYDROCARBON CUTS USING A CATALYST BASED ON HETEROPOLYANIONS TRAPPED IN A MESOSTRUCTURED OXIDE SUPPORT

(75) Inventors: Karin Marchand, Allemagne (DE);
Alexandra Chaumonnot, Lyons (FR);
Audrey Bonduelle, Francheville (FR);
Veronique Dufaud, Villeurbanne (FR);
Frederic Lefebvre, Beaufort (FR);
Manuela Bader, Rennes (FR); Susana Lopes Silva, Lyons (FR)

(73) Assignees: IFP ENERGIES NOUVELLES, Rueil-Malmaison (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 346 days.

(21) Appl. No.: 13/996,762

(22) PCT Filed: Dec. 15, 2011

(86) PCT No.: PCT/FR2011/000651
§ 371 (c)(1),
(2), (4) Date: Aug. 29, 2013

(87) PCT Pub. No.: WO2012/085352
PCT Pub. Date: Jun. 28, 2012

(65) Prior Publication Data
US 2013/0334099 A1  Dec. 19, 2013

(30) Foreign Application Priority Data
Dec. 22, 2010 (FR) ..................... 10 05022

(51) Int. Cl.
| | | |
|---|---|---|
| *C10G 47/00* | (2006.01) | |
| *B01J 27/186* | (2006.01) | |
| *B01J 27/19* | (2006.01) | |
| *C10G 47/12* | (2006.01) | |
| *B01J 29/04* | (2006.01) | |
| *B01J 35/00* | (2006.01) | |
| *B01J 35/10* | (2006.01) | |
| *B01J 37/10* | (2006.01) | |
| *C10G 65/12* | (2006.01) | |
| *C10G 3/00* | (2006.01) | |
| *B01J 27/188* | (2006.01) | |
| *B01J 27/195* | (2006.01) | |
| *B01J 27/198* | (2006.01) | |
| *B01J 37/20* | (2006.01) | |

(52) U.S. Cl.
CPC .............. *C10G 47/12* (2013.01); *B01J 27/186* (2013.01); *B01J 27/19* (2013.01); *B01J 29/041* (2013.01); *B01J 29/044* (2013.01); *B01J 29/045* (2013.01); *B01J 35/002* (2013.01); *B01J 35/1019* (2013.01); *B01J 35/1042* (2013.01); *B01J 35/1061* (2013.01); *B01J 37/10* (2013.01); *C10G 3/46* (2013.01); *C10G 3/48* (2013.01); *C10G 3/50* (2013.01); *C10G 65/12* (2013.01); *B01J 37/20* (2013.01); *C10G 2300/107* (2013.01); *C10G 2300/1011* (2013.01); *C10G 2300/1022* (2013.01); *C10G 2300/1074* (2013.01); *C10G 2300/1077* (2013.01); *C10G 2300/301* (2013.01); *C10G 2300/4018* (2013.01); *Y02P 30/20* (2015.11)

(58) Field of Classification Search
CPC ........ B01J 27/186; B01J 27/188; B01J 27/19; B01J 27/195; B01J 27/198; C10G 45/04; C10G 45/10; C10G 47/12
See application file for complete search history.

(56) References Cited

U.S. PATENT DOCUMENTS

| | | | |
|---|---|---|---|
| 2008/0020926 A1* | 1/2008 | Guillaume et al. | 502/314 |
| 2008/0314797 A1* | 12/2008 | Sinclair et al. | 208/49 |
| 2011/0073522 A1 | 3/2011 | Bonduelle et al. | |
| 2011/0230691 A1 | 9/2011 | Bonduelle et al. | |

FOREIGN PATENT DOCUMENTS

| | | | |
|---|---|---|---|
| FR | 2931705 A1 | 12/2009 | |
| FR | 2935139 A1 | 2/2010 | |

OTHER PUBLICATIONS

Corma, A. et al. (1995). Journal of Catalysis, 153, 25-31.*
International Search Report for PCT/FR2011/000651 (Apr. 12, 2012).
J.W. Zhao et al., "A Combination of Lacunary Polyoxometalates and High-Nuclear Transition-Metal Clusters Under Hydrothermal Conditions. Part II: From Double Cluster, Dimer, and Tetramer to Three-Dimensional Frameworks", Chemistry—A European Journal, vol. 13, No. 36 (2007) pp. 10030-10045.

* cited by examiner

*Primary Examiner* — Brian McCaig
(74) *Attorney, Agent, or Firm* — Millen White Zelano and Branigan, PC; Csaba Henter; Anthony Zelano

(57) ABSTRACT

A process for the hydrocracking a hydrocarbon-containing feedstock in which at least 50% by weight of the compounds have an initial boiling point above 340° C. and a final boiling point below 540° C., using a catalyst having, in its oxide form, at least one metal selected from the metals of groups VIB, VIII and VB, said metals being present in the form of at least one polyoxometallate of formula $(H_hX_xM_mO_y)^{q-}$, said polyoxometallates being present within a mesostructured matrix based on oxide of at least one element Y, said matrix having a pore size between 1.5 and 50 nm and having amorphous walls of thickness between 1 and 30 nm, said catalyst being sulphurized before used in said process.

19 Claims, No Drawings

PROCESS FOR THE HYDROCRACKING OF HYDROCARBON CUTS USING A CATALYST BASED ON HETEROPOLYANIONS TRAPPED IN A MESOSTRUCTURED OXIDE SUPPORT

The invention relates to processes for hydrocracking of hydrocarbon-containing feedstocks in which at least 50% by weight of the compounds have an initial boiling point above 340° C. and a final boiling point below 540° C. Preferably, the hydrocarbon-containing feedstock used in the process according to the invention is a feedstock of the vacuum distillate (VD) type.

The objective of the process according to the invention is essentially the production of middle distillates corresponding to kerosene and gas oil cuts, i.e. cuts having an initial boiling point of at least 150° C. and a final boiling point of at most 370° C., and preferably of at most 340° C.

PRIOR ART

The hydrocracking of heavy petroleum cuts is a very important refining process that makes it possible to produce, starting from surplus heavy feedstocks for which there is little demand for upcycling, lighter fractions such as gasolines, kerosenes and light gas oils that are required by the refiner for adapting production to the structure of demand. Certain hydrocracking processes also make it possible to obtain a highly purified residue that can provide excellent bases for oils. With regard to catalytic cracking, the advantage of catalytic hydrocracking is that it provides middle distillates, kerosene and gas oil, of very good quality. Conversely, the gasoline produced has a much lower octane number than that resulting from catalytic cracking.

Hydrocracking is a process that owes its flexibility to three main elements which are: the operating conditions used, the types of catalysts used, and the fact that the hydrocracking of hydrocarbon-containing feedstocks can be carried out in one or two steps.

The composition and the use of the catalysts for the hydrotreating and hydrocracking of hydrocarbon-containing feedstocks are described in detail, respectively in the work "Hydrocracking Science and Technology", 1996, J. Scherzer, A. J. Gruia, Marcel Dekker Inc. and in the article by B. S. Clausen, H. T. Topsøe, F. E. Massoth, which appeared in the work "Catalysis Science and Technology", 1996, volume 11, Springer-Verlag. Thus, the catalysts used in the hydrocracking processes, whether they are intended for hydrotreating or hydrocracking reactions, are generally characterized by a hydrogenating-dehydrogenating function supplied by the presence of an active phase based on at least one metal of group VIB and/or at least one metal of group VIII of the periodic table. The commonest formulations are of the type cobalt-molybdenum (CoMo), nickel-molybdenum (NiMo) and nickel-tungsten (NiW). These catalysts can be in bulk form (applies specifically to hydrotreating catalysts) or supported, in that case using a porous solid of a different nature. In the latter case, the porous support is generally an amorphous or poorly crystallized oxide (alumina, aluminosilicate, etc.) optionally combined with a zeolitic or a non-zeolitic material. After preparation, at least one group VIB metal and/or at least one group VIII metal that are constituents of said catalysts is/are often in the oxide form. As the active, stable form for the hydrocracking and hydrotreating processes is the sulphurized form, these catalysts must undergo a sulphurizing step. The latter can be carried out in the unit of the process in question (and is then called in-situ sulphurizing) or prior to loading the catalyst into the unit (and is then called ex-situ sulphurizing).

In the particular case of hydrocracking catalysts, these are all of the bifunctional type, combining an acid function with the hydrogenating-dehydrogenating function described above. The acid function is supplied by supports, the surface areas of which generally vary from 150 to 800 $m^2 \cdot g^{-1}$ and display superficial acidity, such as halogenated aluminas (in particular chlorinated or fluorinated), combinations of oxides of boron and of aluminium, amorphous or crystalline mesoporous aluminosilicates, and zeolites. The equilibrium between the two functions, acidic and hydrogenating-dehydrogenating, is one of the parameters determining the activity and selectivity of the hydrocracking catalysts. A weak acid function and a strong hydrogenating-dehydrogenating function give catalysts of low activity, generally operating at a high temperature, preferably greater than or equal to 390 or 400° C. and with a low feed space velocity or HSV, expressed in volume of feedstock to be treated per unit volume of catalyst per hour, and preferably less than or equal to 2, but having very good selectivity for middle distillates. Conversely, a strong acid function and a weak hydrogenating-dehydrogenating function give catalysts that are active, but have lower selectivities for middle distillates (kerosene and gas oil). One type of conventional hydrocracking catalysts is based on moderately acidic amorphous supports, such as mesoporous aluminosilicates for example. These systems are used for producing middle distillates of good quality and, optionally, oil bases. These catalysts are used for example in the single-step processes.

It is generally known to a person skilled in the art that good catalytic performance in the fields of application mentioned above depends on 1) the nature of the hydrocarbon-containing feedstock to be treated, 2) the process used, 3) the operative operating conditions selected and 4) the catalyst used. In the latter case, it is also assumed that a catalyst with a strong catalytic potential is characterized 1) by an optimized hydrogenating-dehydrogenating function (associated active phase perfectly dispersed on the surface of the support and having a high metal content) and 2) in the particular case of processes employing hydrocracking reactions, by a good balance between said hydrogenating-dehydrogenating function and the cracking function as mentioned above. It should also be noted that, ideally, whatever the nature of the hydrocarbon-containing feedstock to be treated, the catalyst must be able to offer accessibility of the active sites for the reactants and reaction products while developing a high active surface area, which leads to specific constraints in terms of intrinsic structure and texture of the oxide support that is a component of said catalysts.

The usual methods for forming the hydrogenating-dehydrogenating phase of the hydrotreating and hydrocracking catalysts consist of depositing molecular precursor(s) of at least one group VIB metal and/or at least one group VIII metal on an oxide support by the so-called "dry impregnation" technique followed by the steps of maturation, drying and calcination leading to the formation of the oxidized form of said metal(s) used. This is followed by the final step of sulphurizing, which generates the active hydrogenating-dehydrogenating phase as mentioned above.

The catalytic performance of catalysts resulting from these "conventional" synthesis protocols has been investigated extensively. In particular, it has been shown that, for relatively high metal contents, phases appear that are refractory to sulphurization, formed as a consequence of the calcination step (sintering phenomenon) (B. S. Clausen, H. T. Topsøe, and F.

E. Massoth, from the work "Catalysis Science and Technology", 1996, volume 11, Springer-Verlag). For example, in the case of catalysts of the CoMo or NiMo type supported on a support of an alumina nature, they are 1) crystallites of $MoO_3$, NiO, CoO, $CoMoO_4$ or $Co_3O_4$, of sufficient size to be detected with XRD, and/or 2) species of the type $Al_2(MoO_4)_3$, $CoAl_2O_4$ or $NiAl_2O_4$. The above three species containing the element aluminium are well known to a person skilled in the art. They result from the interaction between the alumina support and the precursor salts in solution of the active hydrogenating-dehydrogenating phase, which is reflected in concrete terms by a reaction between $Al^{3+}$ ions extracted from the alumina matrix and said salts to form Anderson heteropolyanions of formula $[Al(OH)_6Mo_6O_{18}]^{3-}$, which are themselves precursors of the phases that are refractory to sulphurization. The presence of all of these species leads to a not inconsiderable indirect loss of catalytic activity of the associated catalyst because all of the elements belonging to at least one group VIB metal and/or at least one group VIII metal are not used to the maximum of their potential since a proportion of the latter is immobilized in species with little or no activity.

The catalytic performance of the conventional catalysts described above could therefore be improved, in particular by developing new methods for preparing these catalysts that would make it possible to:

1) ensure a good dispersion of the hydrogenating-dehydrogenating phase, in particular for high metal contents (for example by controlling the size of the particles based on transition metals, maintaining the properties of these particles after thermal treatment, etc.), 2) limit the formation of species refractory to sulphurization (for example by obtaining better synergy between the transition metals constituting the active phase, controlling the interactions between the active hydrogenating-dehydrogenating phase (and/or its precursors) and the porous support used, etc.), 3) ensure a good diffusion of the reactants and the reaction products while maintaining high developed active surface areas (optimization of the chemical, textural and structural properties of the porous support).

The applicant's research therefore led him to prepare hydrocracking catalysts by modifying the chemical and structural composition of the metallic species that are the precursors of the active phases and thus modifying the interactions between the support and the active phase of the catalyst and/or its oxide precursors. In particular, the applicant's research led him to use polyoxometallates the formula of which is explained below as particular oxide precursors of the active phase of the catalysts used in the process for the hydrocracking hydrocarbon-containing feedstocks according to the invention.

Moreover, since the oxide support of the catalyst plays a not inconsiderable role in the development of high-performance hydrocracking catalysts, in that it will induce changes in the interactions between the support and the active phase of said catalyst and/or its oxide precursors, the applicant also directed his research towards the preparation of hydrocracking catalysts using oxide supports having particular textural properties.

The applicant has therefore demonstrated that a catalyst comprising, in its oxide form, at least one active phase precursor in the form of at least one polyoxometallate of formula $(H_hX_xM_mO_y)^{q-}$ explained below, trapped within a mesostructured oxide matrix serving as support, displayed an improved catalytic activity relative to catalysts prepared from standard precursors not containing polyoxometallates, said catalyst being sulphurized and then used in a process for the hydrocracking of at least one hydrocarbon-containing feedstock in which the compounds have boiling points between 340° C. and 540° C.

An objective of the present invention is to provide a process for the hydrocracking of at least one hydrocarbon-containing feedstock in which at least 50% by weight of the compounds have an initial boiling point above 340° C. and a final boiling point below 540° C. and in particular of a feedstock of the vacuum distillate type, using a catalyst displaying improved catalytic performance.

SUMMARY OF THE INVENTION

The invention relates to a process for the hydrocracking of at least one hydrocarbon-containing feedstock in which at least 50% by weight of the compounds have an initial boiling point above 340° C. and a final boiling point below 540° C., using a catalyst comprising, in its oxide form, at least one metal selected from the metals of group VIB, the metals of group VIII and the metals of group VB of the periodic table, used alone or in a mixture, said metals being present in the form of at least one polyoxometallate of formula $(H_hX_xM_mO_y)^{q-}$ in which X is an element selected from phosphorus (P), silicon (Si), boron (B), nickel (Ni) and cobalt (Co), said element being used alone, M is one or more element(s) selected from vanadium (v), niobium (Nb), tantalum (Ta), molybdenum (Mo), tungsten (W), nickel (Ni) and cobalt (Co), O is oxygen, H is hydrogen, h is an integer comprised between 0 and 12, x is an integer comprised between 0 and 4, m is an integer equal to 5, 6, 7, 8, 9, 10, 11, 12 or 18, y is an integer comprised between 17 and 72 and q is an integer comprised between 1 and 20, said polyoxometallates being present within a mesostructured matrix based on the oxide of at least one element Y selected from the group constituted by silicon, aluminium, titanium, zirconium, gallium, and cerium and a mixture of at least one of these elements, said matrix having a pore size between 1.5 and 50 nm and having amorphous walls of thickness comprised between 1 and 30 nm, said catalyst being sulphurized before being used in said process.

INTEREST OF THE INVENTION

One of the advantages of the present invention is that it uses, in a process for the hydrocracking of at least one hydrocarbon-containing feedstock in which at least 50% by weight of the compounds have an initial boiling point above 340° C. and a final boiling point below 540° C., a catalyst having simultaneously the specific catalytic properties due to the presence of polyoxometallates and the textural and surface properties of a mesostructured oxide matrix in which said polyoxometallates are trapped. This results in innovative properties and interactions between said polyoxometallates and the mesostructured inorganic network of said matrix. These interactions are reflected in increased conversion of products boiling at a temperature above 340° C. into products boiling at a temperature below 340° C. and/or in increased hydrodesulphurization (HDS), hydrodenitrogenation (HDN) and hydrodemetallation (HDM). This is due in particular to better dispersion of the active phase through the use of a mesostructured oxide matrix in which the polyoxometallates are trapped.

DESCRIPTION OF THE INVENTION

Feedstocks

Very varied feedstocks can be treated by the hydrocracking processes according to the invention. The feedstock used in the hydrocracking process according to the invention is a hydrocarbon-containing feedstock in which at least 50% by weight of the compounds have an initial boiling point above 340° C. and a final boiling point below 540° C., preferably in which at least 60% by weight, preferably in which at least 75% by weight and more preferably in which at least 80% by weight of the compounds have an initial boiling point above 340° C. and a final boiling point below 540° C.

Advantageously, said hydrocarbon-containing feedstock is selected from vacuum distillates or VD, the effluents originating from a catalytic cracking unit FCC (Fluid Catalytic Cracking), the light gas oils originating from a catalytic cracking unit (or LCO for Light Cycle Oil), the heavy fraction oils (HCO for Heavy Cycle Oil), the paraffinic effluents originating from Fischer-Tropsch synthesis, the effluents originating from vacuum distillation, such as for example gas oil fractions of the VGO (Vacuum Gas Oil) type, the effluents originating from a coal liquefaction process, feedstocks originating from biomass or the effluents derived from the conversion of feedstocks originating from biomass, and the aromatic extracts and the feedstocks obtained from units for the extraction of aromatics, used alone or in a mixture.

Preferably, said hydrocarbon-containing feedstock is a vacuum distillate cut. The vacuum distillate cut generally originates from the vacuum distillation of crude oil. Said vacuum distillate cut comprises aromatic compounds, olefinic compounds, naphthenic compounds and/or paraffinic compounds.

Said vacuum distillate cut advantageously comprises heteroatoms selected from nitrogen, sulphur and a mixture of these two elements. When nitrogen is present in said feedstock to be treated, the nitrogen content is greater than or equal to 500 ppm, preferably said content is between 500 and 10000 ppm by weight, more preferably between 700 and 4000 ppm by weight and even more preferably between 1000 and 4000 ppm. When sulphur is present in said feedstock to be treated, the sulphur content is between 0.01 and 5% by weight, preferably between 0.2 and 4% by weight and even more preferably between 0.5 and 3% by weight.

Advantageously, said vacuum distillate cut can optionally contain metals, in particular nickel and vanadium. The cumulative content of nickel and vanadium in said vacuum distillate cut is preferably less than 1 ppm by weight. The content of asphaltenes in said hydrocarbon-containing feedstock is generally below 3000 ppm, preferably below 1000 ppm, even more preferably below 200 ppm.

In a preferred embodiment, said hydrocarbon-containing feedstock of the vacuum distillate type or VD can be used as it is, i.e. alone or mixed with other hydrocarbon cuts, preferably selected from the effluents originating from a catalytic cracking unit FCC (Fluid Catalytic Cracking), light gas oils originating from a catalytic cracking unit (or LCO for Light Cycle Oil), heavy fraction oils (HCO for Heavy Cycle Oil), the atmospheric residues and vacuum residues originating from atmospheric and vacuum distillation of crude oil, the paraffinic effluents originating from Fischer-Tropsch synthesis, the effluents originating from vacuum distillation, for example gas oil fractions of the VGO type (Vacuum Gas Oil), the deasphalted oils or DAO, the effluents originating from a coal liquefaction process, the feedstocks originating from biomass or the effluents derived from the conversion of feedstocks originating from biomass, and the aromatic extracts and the feedstocks originating from units for the extraction of aromatics, used alone or in a mixture.

In the preferred case when said hydrocarbon-containing feedstock of the vacuum distillate type or VD is used mixed with other hydrocarbon-containing cuts, said hydrocarbon-containing cuts, added alone or in a mixture, are present at max. 50% by weight of said mixture, preferably at max. 40% by weight, preferably at max. 30% by weight and more preferably at max. 20% by weight of said mixture.

According to the invention, the catalyst used in said process for the hydrocracking of at least said hydrocarbon-containing feedstock comprises in its oxide form, i.e. before undergoing a sulphurizing step generating the sulphurized active phase, at least one metal selected from the metals of group VIB, the metals of group VIII and the metals of group VB of the periodic table, used alone or in a mixture, said metals being present in the form of at least one polyoxometallate of formula $(H_hX_xM_mO_y)^{q-}$ explained above, said polyoxometallates being present within a mesostructured oxide matrix.

More precisely, said polyoxometallates present within said matrix are trapped in the walls of said matrix. Said polyoxometallates therefore are not simply deposited for example by impregnation on the surface of the pores of said matrix but are located right inside the walls of said matrix.

The particular location of said polyoxometallates right inside the walls of said mesostructured oxide matrix permits a better interaction between said matrix serving as support and the active phase and/or its oxide precursors comprising said polyoxometallates. This also results in better maintenance of the textural and structural properties of the mesostructured oxide matrices, improved maintenance of the structure of said polyoxometallate and preferably of said heteropolyanion after post-treatment of the final solid, as well as improvement in the dispersion, heat resistance and chemical resistance of said polyoxometallate.

Although a misuse of language, the polyoxometallates used according to the invention are defined hereinafter as the compounds corresponding to the formula $(H_hX_xM_mO_y)^{q-}$ in which X is an element selected from phosphorus (P), silicon (Si), boron (B), nickel (Ni) and cobalt (Co), said element being used alone, M is one or more element(s) selected from vanadium (v), niobium (Nb), tantalum (Ta), molybdenum (Mo), tungsten (W), nickel (Ni) and cobalt (Co), O is oxygen, H is hydrogen, h is an integer comprised between 0 and 12, x is an integer comprised between 0 and 4, m is an integer equal to 5, 6, 7, 8, 9, 10, 11, 12 or 18, y is an integer comprised between 17 and 72 and q is an integer comprised between 1 and 20.

Preferably, element M cannot be a nickel atom or a cobalt atom alone.

The polyoxometallates defined according to the invention include two families of compounds, the isopolyanions and the heteropolyanions. These two families of compounds are defined in the article Heteropoly and Isopoly Oxometallates, Pope, Publ Springer-Verlag, 1983.

The isopolyanions that can be used in the present invention are polyoxometallates of general formula $(H_hX_xM_mO_y)^{q-}$ in which x=0, the other elements having the meaning given above.

Preferably, the m atoms M of said isopolyanions are either only molybdenum atoms, or only tungsten atoms, or only group VB atoms selected from vanadium (V), niobium (Nb) and tantalum (Ta), or a mixture of a molybdenum and a vanadium atom (MoV), or a mixture of a niobium and a tungsten atom (NbW).

The m atoms M of said isopolyanions can also advantageously be either a mixture of nickel, molybdenum and tungsten atoms or a mixture of cobalt, molybdenum and tungsten atoms.

Preferably, in the case where element M is molybdenum (Mo), m is equal to 7. Moreover, preferably, in the case where element M is tungsten (W), m is equal to 12.

The isopolyanions $Mo_7O_{24}^{6-}$ and $H_2W_{12}O_{40}^{6-}$ are advantageously used as active phase precursors in the context of the invention.

Said isopolyanions are advantageously formed by reaction of the oxoanions of the type $MO_4^{2-}$ with one another. For example, the molybdic compounds are well known for reactions of this kind, since depending on the pH, the molybdic compound in solution can be in the form $MoO_4^{2-}$ or in the form of an isopolyanion of formula $Mo_7O_{24}^{6-}$, which is obtained according to the reaction: $7MoO_4^{2-}+8H^+ \rightarrow Mo_7O_{24}^{6-}+4H_2O$. In the case of the isopolyanions in which M is a tungsten atom, potential acidification of the reaction mixture, through causing the formation of tungstates $WO_4^{2-}$, can result in generating α-metatungstate, 12 times condensed according to the following reaction: $12WO_4^{2-}+18H^+ \rightarrow H_2W_{12}O_{40}^{6-}+8H_2O$.

The heteropolyanions that can be used in the present invention are polyoxometallates of formula $(H_hX_xM_mO_y)^{q-}$ in which x=1, 2, 3 or 4, the other elements having the meaning given above.

The heteropolyanions generally have a structure in which element X is the "central" atom and element M is a metal atom, nearly always in octahedral coordination with X≠M.

Preferably, the m atoms M are either only molybdenum atoms, or only tungsten atoms, (or only group VB atoms selected from vanadium (V), niobium (Nb) and tantalum (Ta), or a mixture of molybdenum and cobalt atoms (CoMo), or a mixture of molybdenum and nickel (NiMo), or a mixture of tungsten and molybdenum atoms (MoW), or a mixture of tungsten and nickel atoms (NiW). Preferably, the m atoms M are either only molybdenum atoms, or a mixture of molybdenum and cobalt atoms, or one or a mixture of molybdenum and nickel (NiMo). Preferably, the m atoms M cannot be only nickel atoms, nor only cobalt atoms.

Among the m atoms M of said heteropolyanions, the group VIII elements are partially replaced with group VIB elements and/or with group VB elements.

In particular, in the case where the m atoms M are either a mixture of molybdenum and cobalt atoms, or a mixture of molybdenum and nickel, or a mixture of tungsten and cobalt atoms, or a mixture of tungsten and nickel atoms, the cobalt and nickel atoms are partially replaced with molybdenum and tungsten atoms and preferably with molybdenum atoms. Preferably, element X is at least one phosphorus atom.

The heteropolyanions are advantageously obtained by polycondensation of oxoanions of the type $MO_4^{2-}$, in the case where M is a molybdenum or tungsten atom, around one or more oxoanion(s) of the type $XO_4^{q-}$ in which the charge q is dictated by the octet rule and the position of the element X in the periodic table. There is then elimination of water molecules and creation of oxo bridges between the atoms. These condensation reactions are governed by various experimental factors such as the pH, the concentration of the species in solution, the nature of the solvent, and the m/x ratio, which is the ratio of the number of atoms of element M to the number of atoms of element X.

The heteropolyanions are negatively charged polyoxometallate species. In order to compensate these negative charges, it is necessary to introduce counter-ions and more particularly cations. These cations can advantageously be protons $H^+$, or any other cation of the $NH_4^+$ type or metal cations and in particular metal cations of group VIII metals.

In the case where the counter-ions are protons, the molecular structure comprising the heteropolyanion and at least one proton constitutes a heteropolyacid. The heteropolyacids that can be used as active phase precursors in the present invention can be for example phosphomolybdic acid ($3H^+.PMo_{12}O_{40}^{3-}$) or phosphotungstic acid ($3H^+.PW_{12}O_{40}^{3-}$).

In the case where the counter-ions are not protons, this molecular structure is then called a heteropolyanion salt. It is then possible, advantageously, to benefit from the association within the same molecular structure, via the use of a heteropolyanion salt, of metal M and of its promoter, i.e. of the element cobalt and/or of the element nickel which can either be in position X within the structure of the heteropolyanion, or partially substituted with at least one atom M of molybdenum and/or of tungsten within the structure of the heteropolyanion or in the position of a counter-ion.

Preferably, the polyoxometallates used according to the invention are the compounds corresponding to the formula $(H_hX_xM_mO_y)^{q-}$ in which X is an element selected from phosphorus (P), silicon (Si), boron (B), nickel (Ni) and cobalt (Co), said element being used alone, M is one or more element(s) selected from vanadium (V), niobium (Nb), tantalum (Ta), molybdenum (Mo), tungsten (W), nickel (Ni) and cobalt (Co), O is oxygen, H is hydrogen, h is an integer comprised between 0 and 6, x is an integer that can be equal to 0, 1 or 2, m is an integer equal to 5, 6, 7, 9, 10, 11 or 12, y is an integer comprised between 17 and 48 and q is an integer comprised between 3 and 12.

Depending on the desired type of catalyst, non exhaustively and as an example, polyoxometallates combining within their structure an active phase based on cobalt and molybdenum (systems CoMo), nickel and molybdenum (NiMo systems), nickel and tungsten (NiW), molybdenum and vanadium (MoV system), nickel, molybdenum and vanadium (NiMoV systems), phosphorus and molybdenum (PMo), silicon and molybdenum (SiMo), can advantageously be used.

More preferably, the polyoxometallates used according to the invention are the compounds corresponding to the formula $(H_hX_xM_mO_y)^{q-}$ in which h is an integer equal to 0, 1, 4 or 6, x is an integer equal to 0, 1 or 2, m is an integer equal to 5, 6, 10 or 12, y is an integer equal to 23, 24, 38 or 40 and q is an integer equal to 3, 4, 5, 6, 7 or 8, X, M, H and O having the meaning given above.

The preferred polyoxometallates used according to the invention are advantageously selected from the polyoxometallates of formula $PVMo_{11}O_{40}^{4-}$, $PV_2Mo_{10}O_{40}^{5-}$, $PV_3Mo_9O_{40}^{6-}$ and $PV_4Mo_8O_{40}^{7-}$, $HPNiMo_{11}O_{40}^{6-}$, $P_2Mo_5O_{23}^{6-}$, $Ni_2Mo_{10}O_{38}H_4^{8-}$, $NiMo_6O_{24}H_6^{4-}$, $PMo_{12}O_{40}^{3-}$, $PW_{12}O_{40}^{3-}$ and $PMo_{(11-z)}W_zO_{40}^{3-}$ with z being between 1 and 11. The most preferred polyoxometallates used according to the invention are advantageously selected from the polyoxometallates of formula $PVMo_{11}O_{40}^{4-}$, $PV_2Mo_{10}O_{40}^{5-}$, $PV_3Mo_9O_{40}^{6-}$ and $PV_4Mo_8O_{40}^{7-}$, $HPNiMo_{11}O_{40}^{6-}$, $P_2Mo_5O_{23}^{6-}$, $Ni_2Mo_{10}O_{38}H_4^{8-}$, $NiMo_6O_{24}H_6^{4-}$, $PMo_{12}O_{40}^{3-}$, $PW_{12}O_{40}^{3-}$ and $PMo_3W_9O_{40}^{3-}$, $PMo_6W_6O_{40}^{3-}$, used alone or in a mixture.

The preferred polyoxometallates that can advantageously be used as active phase precursors of the catalyst used in the process according to the invention are the so-called Anderson heteropolyanions of general formula $XM_6O_{24}^{q-}$ for which the m/x ratio is equal to 6 and in which the elements X and M and the charge q have the meaning given above. Element X is therefore an element selected from phosphorus (P), silicon (Si), boron (B), nickel (Ni) and cobalt (Co), said element being used alone, M is one or more element(s) selected from vanadium (V), niobium (Nb), tantalum (Ta), molybdenum (Mo), tungsten (W), nickel (Ni) and cobalt (Co), and q is an integer comprised between 1 and 20 and preferably between 3 and 12.

The particular structure of said so-called Anderson heteropolyanions is described in the article Nature, 1937, 150, 850. The structure of said so-called Anderson heteropolyanions comprises 7 octahedra located in one and the same plane and joined together by the edges: out of the 7 octahedra, 6 octahedra surround the central octahedron containing element X.

The Anderson heteropolyanions containing cobalt and molybdenum or nickel and molybdenum within their structure are preferred. The Anderson heteropolyanions of formula $CoMo_6O_{24}H_6^{3-}$ and $NiMo_6O_{24}H_6^{4-}$ are particularly preferred. According to the formula, in these Anderson heteropolyanions, the cobalt and nickel atoms are respectively the heteroelements X of the structure.

In fact, said heteropolyanions combine molybdenum and cobalt or molybdenum and nickel in the same structure. In particular, the latter make it possible, when they are in the form of cobalt salts or nickel salts, to reach an atomic ratio of said promoter to the metal M and in particular an atomic ratio (Co and/or Ni)/Mo between 0.4 and 0.6. This ratio of said promoter (Co and/or Ni)/Mo between 0.4 and 0.6 is particularly preferred for maximizing the performance of the hydrotreating and in particular hydrodesulphurization catalysts used in the process according to the invention.

In the case where the Anderson heteropolyanion contains cobalt and molybdenum within its structure, a mixture of the two forms, monomeric of formula $CoMo_6O_{24}H_6^{3-}$ and dimeric of formula $Co_2Mo_{10}O_{38}H_4^{6-}$ of said heteropolyanion, the two forms being in equilibrium, can advantageously be used. In the case where the Anderson heteropolyanion contains cobalt and molybdenum within its structure, said Anderson heteropolyanion is preferably dimeric of formula $Co_2Mo_{10}O_{38}H_4^{6-}$.

In the case where the Anderson heteropolyanion contains nickel and molybdenum within its structure, a mixture of the two forms, monomeric of formula $NiMo_6O_{24}H_6^{4-}$ and dimeric of formula $Ni_2Mo_{10}O_{38}H_4^{8-}$ of said heteropolyanion, the two forms being in equilibrium, can advantageously be used. In the case where the Anderson heteropolyanion contains nickel and molybdenum within its structure, said Anderson heteropolyanion is preferably monomeric of formula $NiMo_6O_{24}H_6^{4-}$.

The Anderson heteropolyanions very preferably used in the invention are the Anderson heteropolyanions containing nickel and molybdenum within their structure of formula $NiMo_6O_{24}H_6^{4-}$ and $Ni_2Mo_{10}O_{38}H_4^{8-}$, alone or mixed.

Salts of Anderson heteropolyanions can also be used advantageously as active phase precursors according to the invention. Said salts of Anderson heteropolyanions are advantageously selected from the cobalt or nickel salts of the monomeric ion 6-molybdocobaltate or respectively of formula $CoMo_6O_{24}H_6^{3-}.\ ^3\!/\!_2 Co^{2+}$ or $CoMo_6O_{24}H_6^{3-}.\ ^3\!/\!_2 Ni^{2+}$ having an atomic ratio of said promoter (Co and/or Ni)/Mo of 0.41, the cobalt or nickel salts of the dimeric ion decamolybdocobaltate of formula $Co_2Mo_{10}O_{38}H_4^{6-}.3Co^{2+}$ or $Co_2Mo_{10}O_{38}H_4^{6-}.3Ni^{2+}$ having an atomic ratio of said promoter (Co and/or Ni)/Mo of 0.5, the cobalt or nickel salts of the ion 6-molybdonickelate of formula $NiMo_6O_{24}H_6^{4-}.2Co^{2+}$ or $NiMo_6O_{24}H_6^{4-}.2Ni^{2+}$ having an atomic ratio of said promoter (Co and/or Ni)/Mo of 0.5, and the cobalt or nickel salts of the dimeric ion decamolybdonickelate of formula $Ni_2Mo_{10}O_{38}H_4^{8-}.4Co^{2+}$ or $Ni_2Mo_{10}O_{38}H_4^{8-}.4Ni^{2+}$ having an atomic ratio of said promoter (Co and/or Ni)/Mo of 0.6.

The salts of Anderson heteropolyanions very preferably used in the invention are selected from the salts of heteropolyanions containing nickel and molybdenum within their structure of formula $NiMo_6O_{24}H_6^{4-}.2Co^{2+}$, $NiMo_6O_{24}H_6^{4-}.2Ni^{2+}$, $Ni_2Mo_{10}O_{38}H_4^{8-}.4Co^{2+}$ and $Ni_2Mo_{10}O_{38}H_4^{8-}.4Ni^{2+}$, alone or mixed.

Other preferred polyoxometallates that can advantageously be used as active phase precursors of the catalyst used in the process according to the invention are the so-called Keggin heteropolyanions of general formula $XM_{12}O_{40}^{q-}$ for which the m/x ratio is equal to 12 and the so-called lacunary Keggin heteropolyanions of general formula $XM_{11}O_{39}^{q-}$ for which the m/x ratio is equal to 11 and in which the elements X and M and the charge q have the meaning given above. X is therefore an element selected from phosphorus (P), silicon (Si), boron (B), nickel (Ni) and cobalt (Co), said element being used alone, M is one or more element(s) selected from vanadium (V), niobium (Nb), tantalum (Ta), molybdenum (Mo), tungsten (W), nickel (Ni) and cobalt (Co), and q is an integer comprised between 1 and 20 and preferably between 3 and 12.

Said Keggin species are advantageously obtained for variable pH ranges depending on the routes for obtaining them described in the work by A. Griboval, P. Blanchard, E. Payen, M. Fournier, J. L. Dubois, Chem. Lett., 1997, 12, 1259.

Preferred Keggin heteropolyanions, advantageously used as active phase precursors according to the invention, are selected from the heteropolyanions of formula $PMo_{12}O_{40}^{3-}$, $PW_{12}O_{40}^{3-}$, $PMo_3W_9O_{40}^{3-}$, $PMo_6W_6O_{40}^{3-}$, $PVMo_{11}O_{40}^{4-}$, $PV_2Mo_{10}O_{40}^{5-}$, $PV_3Mo_9O_{40}^{6-}$, $PV_4Mo_8O_{40}^{7-}$ and $PMo_{(11-z)}W_zO_{40}^{3-}$ with z being between 1 and 11, used alone or in a mixture, preferably the preferred Keggin heteropolyanions are selected from the heteropolyanions of formula $PW_{12}O_{40}^{3-}$, $PMo_3W_9O_{40}^{3-}$ and $PMo_6W_6O_{40}^{3-}$ and preferably from the heteropolyanions of formula $PW_{12}O_{40}^{3-}$ and $PMo_6W_6O_{40}^{3-}$, used alone or in a mixture.

The preferred Keggin heteropolyanions can also be used advantageously in the invention in their heteropolyacid form of formula $PW_{12}O_{40}^{3-}.3H^+$ and $PMo_3W_9O_{40}^{3-}.3H^+$.

In said Keggin heteropolyanions of the above formula, at least one molybdenum atom is substituted respectively with a nickel atom, with a cobalt atom or with at least one vanadium atom.

Said heteropolyanions mentioned above are described in the works of L. G. A. van de Water, J. A. Bergwerff, B. R. G. Leliveld, B. M. Weckhuysen, K. P. de Jong, J. Phys. Chem. B, 2005, 109, 14513 and of D. Soogund, P. Lecour, A. Daudin, B. Guichard, C. Legens, C. Lamonier, E. Payen in Appl. Catal. B, 2010, 98, 1, 39.

Salts of heteropolyanions of the Keggin or lacunary Keggin type can also be used advantageously as active phase precursors according to the invention. Preferred salts of heteropolyanions or of heteropolyacids of the Keggin and lacunary Keggin type are advantageously selected from the cobalt or nickel salts of the phosphomolybdic, silicomolybdic, phosphotungstic or silicotungstic acids. Said salts of heteropolyanions or of heteropolyacids of the Keggin or lacunary Keggin type are described in U.S. Pat. No. 2,547, 380. Preferably, a heteropolyanion salt of the Keggin type is the nickel phosphotungstate of formula $^3\!/\!_2 Ni^{2+}.PW_{12}O_{40}^{3-}$ having an atomic ratio of group VI metal to group VIII metal, i.e. Ni/W of 0.125.

Other salts of heteropolyanions or of heteropolyacids of the Keggin or lacunary Keggin type that can advantageously be used as active phase precursors according to the invention are the salts of heteropolyanions or of heteropolyacids of general formula $Z_xXM_{12}O_{40}$ (or $xZ^{p+}$, $XM_{12}O_{40}^{(p-x)-}$, a formula showing the counter-ion $Z^{p+}$), in which Z is cobalt and/or nickel, X is phosphorus, silicon or boron and M is molybdenum and/or tungsten, x takes a value of 2 or more if X is phosphorus, of 2.5 or more if X is silicon and of 3 or more if X is boron. Said salts of heteropolyanions or of heteropolyacids of the Keggin or lacunary Keggin type are described in patent FR2749778. These structures offer the particular advantage relative to the structures described in U.S. Pat. No. 2,547,380 of reaching higher atomic ratios of the group VIII element to the group VI element and in particular above 0.125.

This increase in said ratio is obtained by reduction of said salts of heteropolyanions or of heteropolyacids of the Keggin or lacunary Keggin type. Thus, the presence of at least a part of the molybdenum and/or of the tungsten is at a valence lower than its normal value of six as results from the composition, for example, of phosphomolybdic, phosphotungstic, silicomolybdic or silicotungstic acid.

Higher atomic ratios of the group VIII element to the group VI element are particularly preferred for maximizing the performance of the hydrotreating and in particular hydrodesulphurization catalysts used in the process according to the invention.

The substituted salts of Keggin heteropolyanions of formula $Z_xXM_{11}O_{40}Z'C_{(z-2x)}$ in which Z' is substituted with an atom M and in which Z is cobalt and/or nickel, X is phosphorus, silicon or boron and M is molybdenum and/or tungsten, Z' is cobalt, iron, nickel, copper or zinc, and C is an $H^+$ ion or an alkylammonium cation, x has a value from 0 to 4.5, z has a value between 7 and 9, said salts being described in patent FR2764211, can also be used advantageously as active phase precursors according to the invention. Thus, said salts of Keggin heteropolyanions correspond to those described in patent FR2749778 but in which an atom Z' is substituted with an atom M. Said substituted salts of Keggin heteropolyanions are particularly preferred as they lead to atomic ratios of group VIII element to group VI element of up to 0.5.

The nickel salts of a heteropolyanion of the lacunary Keggin type described in patent application FR2935139 can also be used advantageously as active phase precursors according to the invention. The nickel salts of a heteropolyanion of the lacunary Keggin type comprising tungsten in its structure have a general formula $Ni_{x+y/2}XW_{11-y}O_{39-5/2y}$, $zH_2O$ in which Ni is nickel, X is selected from phosphorus, silicon and boron, W is tungsten, O is oxygen, y=0 or 2, x=3.5 if X is phosphorus, x=4 if X is silicon, x=4.5 if X is boron and z is a number between 0 and 36, and in which said molecular structure does not have any nickel atom substituting a tungsten atom in its structure, said nickel atoms being placed in a counter-ion position in the structure of said compound. One advantage of this invention is the greater solubility of these salts of heteropolyanions.

The nickel salts of the heteropolyanion of the lacunary Keggin type very preferably used in the invention are selected from the nickel salts of the heteropolyanion of formula $Ni_4SiW_{11}O_{39}$ and $Ni_5SiW_9O_{34}$, used alone or in a mixture according to the formulation of patent application FR2935139 or of formula $SiW_{11}O_{39}.4Ni^{2+}$ and $SiW_9O_{34}.5Ni^{2+}$ according to the invention.

Other preferred polyoxometallates that can advantageously be used as active phase precursors of the catalyst used in the process according to the invention are the so-called Strandberg heteropolyanions of formula $H_hP_2Mo_5O_{23}^{(6-h)-}$ in which h is equal to 0, 1 or 2 and for which the m/x ratio is equal to 5/2.

The preparation of said Strandberg heteropolyanions is described in the article of W—C. Cheng, N. P. Luthra, J. Catal., 1988, 109, 163. This has been demonstrated by J. A. Bergwerff, T. Visser, B. R. G. Leliveld, B. D. Rossenaar, K. P. de Jong, B. M. Weckhuysen, Journal of the American Chemical Society 2004, 126, 44, 14548.

A particularly preferred Strandberg heteropolyanion used in the invention is the heteropolyanion of formula $P_2Mo_5O_{23}^{6-}$.

Thus, with the various methods of preparation, numerous polyoxometallates and their associated salts are available with variable promoter X/metal M ratios. In general, all these polyoxometallates and their associated salts can be used advantageously for preparing the catalysts used in the process according to the invention. However, the above list is not exhaustive and other combinations can be envisaged.

The use of polyoxometallates for preparing catalysts used in the process according to the invention offers many advantages from the catalytic standpoint. Said polyoxometallates, which are oxide precursors combining within the same molecular structure at least one group VIB element, preferably molybdenum and/or tungsten and/or at least one group VIII element, preferably cobalt and/or nickel and/or at least one group VB element, preferably vanadium and/or niobium and/or tantalum, lead after sulphurizing to catalysts the catalytic performance of which is improved owing to a better promotion effect, i.e. better synergy between the group VIB element, the group VIII element and the group VB element.

Preferably, in the case where the catalyst used in the process according to the invention comprises at least one group VIB element, said catalyst comprises a total content by weight of group VIB element expressed in percentage by weight of oxide relative to the total weight of the catalyst comprised between 2 and 35% by weight and preferably comprised between 5 and 25% by weight.

Said contents are the total contents of group VIB element whatever the form of said group VIB element present in said catalyst and optionally regardless of its manner of introduction. Said contents are therefore representative of the content of group VIB element present either in the form of at least one polyoxometallate within the mesostructured oxide matrix, or in any other form depending on its manner of introduction, such as in the form of oxide for example.

Preferably, in the case where the catalyst used in the process according to the invention comprises a group VIII element, said catalyst comprises a content by weight of the group VIII element expressed in percentage by weight of oxide relative to the total weight of the catalyst between 0.1 and 10% by weight and preferably between 0.5 and 7% by weight.

Said contents are the total contents of group VIII element whatever the form of said group VIII element present in said catalyst and optionally regardless of its manner of introduction. Said contents are therefore representative of the content of group VIII element present either in the form of at least one polyoxometallate within the mesostructured oxide matrix whether it is in position M or in position X, or present in the form of a counter-ion and/or optionally added at different steps of the preparation of said mesostructured oxide matrix as described below, or in any other form depending on its manner of introduction, such as in the form of oxide for example.

Preferably, in the case where the catalyst used in the process according to the invention comprises a group VB element, said catalyst comprises a content by weight of the group VB element expressed in percentage by weight of oxide relative to the total weight of the catalyst comprised between 0.1 and 10% by weight and preferably comprised between 1 and 7% by weight.

Said contents are the total contents of group VB element whatever the form of said group VB element present in said catalyst and optionally regardless of its manner of introduction. Said contents are therefore representative of the content of group VB element present, either in the form of at least one polyoxometallate within the mesostructured oxide matrix or in any other form depending on its manner of introduction, such as in the form of oxide for example.

Preferably, in the case where the catalyst used in the process according to the invention comprises a doping element selected from phosphorus, boron and silicon, said catalyst comprises a content by weight of doping element selected from phosphorus, boron and silicon expressed in percentage by weight of oxide relative to the total weight of the catalyst comprised between 0.1 and 10% by weight and preferably comprised between 0.1 and 5% by weight.

Said contents are the total contents of doping element selected from phosphorus, boron and silicon whatever the form of said doping element present in said catalyst and regardless of its manner of introduction. Said contents are therefore representative both of the content of doping element selected from phosphorus, boron and silicon present in the form of at least one polyoxometallate within the mesostructured oxide matrix in position X and/or optionally added at different steps of the preparation of said mesostructured oxide matrix as described below, or in any other form depending on its manner of introduction, such as in the form of oxide for example.

According to the invention, said polyoxometallates defined above are present within a mesostructured matrix based on oxide of at least one element Y selected from the group constituted by silicon, aluminium, titanium, zirconium, gallium, and cerium and a mixture of at least one of these elements, said matrix having a pore size comprised between 1.5 and 50 nm and having amorphous walls of thickness comprised between 1 and 30 nm and preferably between 1 and 10 nm.

By mesostructured matrix is meant, within the context of the present invention, an inorganic solid having a porosity organized at a scale of the mesopores of each of the elementary particles constituting said solid, i.e. a porosity organized at the scale of the pores having a uniform size comprised between 1.5 and 50 nm and preferably between 1.5 and 30 nm and even more preferably between 4 and 16 nm and distributed uniformly and regularly in each of said particles constituting the matrix. The material located between the mesopores of each of the elementary particles of the oxide matrix of the precursor of the catalyst used in the process according to the invention is amorphous and forms walls or sides the thickness of which is comprised between 1 and 30 nm and preferably between 1 and 10 nm. The thickness of the walls corresponds to the distance separating one pore from another pore. The organization of the mesoporosity described above leads to a structuring of the oxide matrix, which can be hexagonal, vermicular or cubic and preferably hexagonal.

Generally, said "mesostructured" materials are advantageously obtained by synthesis methods called "soft chemistry" (G. J. de A. A. Soler-Illia, C. Sanchez, B. Lebeau, J. Patarin, Chem. Rev., 2002, 102, 4093) at low temperature via the coexistence in aqueous solution or in solvents with marked polarity, of inorganic precursors with structure-forming agents, generally ionic or neutral molecular or supramolecular surfactants. Control of the electrostatic or hydrogen bonding interactions between the inorganic precursors and the structure-forming agent jointly linked with hydrolysis/condensation reactions of the inorganic precursor leads to a cooperative assembly of the organic and inorganic phases generating micellar aggregates of surfactants of controlled, uniform size within an inorganic matrix. This phenomenon of cooperative self-assembly governed by, among other things, the concentration of structure-forming agent can be induced by gradual evaporation of a solution of reactants whose concentration of structure-forming agent is below the critical micellar concentration, or via precipitation or direct gelling of the solid when using a solution of precursors with higher concentration of reactants.

The porosity is then released by removing the surfactant, which is carried out conventionally by methods of chemical extraction or by thermal treatment.

Depending on the nature of the inorganic precursors and of the structure-forming agent used as well as the operating conditions applied, several families of mesostructured materials have been developed. The family M41S is constituted by mesoporous materials obtained by using ionic surfactants such as quaternary ammonium salts, having a structure that is generally hexagonal, cubic or lamellar, pores of uniform size in a range from 1.5 to 10 nm and amorphous walls with thickness of the order of 1 to 2 nm. The family M41S was initially developed by Mobil in the article J. S. Beck, J. C. Vartuli, W. J. Roth, M. E. Leonowicz, C. T. Kresge, K. D. Schmitt, C. T.-W. Chu, D. H. Olson, E. W. Sheppard, S. B. McCullen, J. B. Higgins, J. L. Schlenker, J. Am. Chem. Soc., 1992, 114, 27, 10834.

The family of materials designated SBA is characterized by the use of amphiphilic macromolecular structure-forming agents of the block copolymer type. These materials are characterized by a structure that is generally hexagonal, cubic or lamellar, pores of uniform size in a range from 4 to 50 nm and amorphous walls with thickness in a range from 3 to 7 nm.

According to the invention, element Y present in the form of oxide in said mesostructured matrix is selected from the group constituted by silicon, aluminium, titanium, zirconium, gallium, and cerium and a mixture of at least one of these elements. Preferably, said element Y is selected from the group constituted by silicon, aluminium, titanium, zirconium, and a mixture of at least one of these elements.

According to the invention, said mesostructured matrix is preferably constituted by silicon oxide, in this case said matrix is purely silicic, or of a mixture of silicon oxide and aluminium oxide, and preferably said mesostructured matrix consists of a mixture of silicon oxide and aluminium oxide.

In the preferred case where said mesostructured matrix is purely silicic, said matrix is advantageously a mesostructured matrix belonging to the family M41S or to the family of materials designated SBA and preferably a matrix of the type SBA-15.

In the preferred case when said mesostructured matrix is constituted by a mixture of silicon oxide and aluminium oxide, said matrix has a molar ratio Si/Al at least equal to 0.02, preferably comprised between 0.1 and 1000 and very preferably comprised between 1 and 100.

According to the invention, said polyoxometallates defined above are present within a mesostructured oxide matrix. More precisely, said polyoxometallates present within said mesostructured oxide matrix are trapped right inside said matrix. Preferably, said polyoxometallates are present in the walls of said mesostructured matrix. Occlusion of said polyoxometallates in the walls of said mesostructured matrix can be carried out by a so-called direct synthesis technique, during synthesis of said matrix serving as support by adding desired polyoxometallates to the reactants that are the precursors of the inorganic oxide network of the matrix.

Said mesostructured oxide matrix comprising said polyoxometallates trapped in its walls used in the process according to the invention is advantageously prepared exclusively by direct synthesis.

More precisely, said mesostructured oxide matrix is advantageously obtained by a preparation method comprising: a) a step of forming at least one polyoxometallate of the formula mentioned above according to a method known to a person skilled in the art, b) a step of mixing, in solution, at least one surfactant, at least one silica precursor, at least one precursor of at least one element Y selected from the group constituted by silicon, aluminium, titanium, zirconium, gallium, and cerium and a mixture of at least one of these elements, then at least one polyoxometallate obtained according to step a) in order to obtain a colloidal solution, c) a maturation step of said colloidal solution obtained at the end of step b) with respect to time and temperature; d) an optional step of autoclaving the suspension obtained at the end of step c), e) a step of filtration of the suspension obtained at the end of step c) and after optional passage through the step of autoclaving, washing and drying of the solid thus obtained, f) a step of removing said surfactant leading to the generation of uniform and organized mesoporosity of the mesostructured matrix, g) an optional step of treatment of the solid obtained at the end of step f) in order to partially or completely regenerate the polyoxometallate entity optionally partially or completely decomposed during step f), and h) an optional step of drying said solid thus obtained constituted by said mesostructured oxide matrix comprising said polyoxometallates trapped in its walls.

Step a) of formation of at least one polyoxometallate with the aforementioned formula is advantageously carried out according to a method known to a person skilled in the art. Preferably, the polyoxometallates described above as well as their associated preparation methods are used in the method for the preparation of said mesostructured oxide matrix comprising said polyoxometallates trapped in its walls.

Step b) of said preparation method consists of mixing, in solution, at least one surfactant, at least one silica precursor, at least one precursor of at least one element Y selected from the group constituted by silicon, aluminium, titanium, zirconium, gallium, and cerium and mixing at least one of these elements, and then at least one polyoxometallate obtained according to step a) in order to obtain a colloidal solution.

Preferably, at least one surfactant, at least one silica precursor and at least one precursor of at least one element Y selected from the group constituted by silicon, aluminium, titanium, zirconium, gallium, and cerium and a mixture of at least one of these elements are mixed in solution for a period of between 15 minutes and 1 hour, then at least one polyoxometallate obtained according to step a) mixed in a solution of the same kind and preferably the same solution is added to the previous mixture in order to obtain a colloidal solution.

The mixing step b) is carried out with stirring at a temperature between 25° C. and 80° C. and preferably between 25° C. and 50° C. for a period between 5 minutes and 2 h and preferably between 30 minutes and 1 h.

In the case where element Y is selected from the group constituted by silicon, aluminium, titanium, zirconium, gallium, and cerium and a mixture of at least one of these elements, the precursor(s) of said element Y is(are) advantageously an inorganic salt of said element Y of formula $YZ_n$ (n=3 or 4), Z being a halogen, the $NO_3$ group or a perchlorate, and preferably Z is chlorine. The precursor(s) of said element Y in question can also be an (one of the) alkoxide precursor(s) of formula $Y(OR)_n$—, where R=ethyl, isopropyl, n-butyl, s-butyl, t-butyl, etc. or a chelated precursor such as $Y(C_5H_8O_2)_n$, with n=3 or 4. The precursor(s) of said element Y can also be an (one of the) oxide(s) or a (one of the) hydroxide(s) of said element Y. Depending on the nature of the element Y, the precursor of element Y can also be of the form $YOZ_2$, Z being a monovalent anion such as a halogen or the $NO_3$ group.

In the preferred case where said mesostructured matrix is purely silicic, i.e. in the case where said matrix is constituted by silicon oxide, at least one silicic precursor is introduced in step b) of mixing in solution.

The silicic precursor is advantageously obtained starting from any source of silica and advantageously from a sodium silicate precursor of formula $Na_2SiO_3$, from a chlorinated precursor of formula $SiCl_4$, from an alkoxide precursor of formula $Si(OR)_4$ where R=H, methyl, ethyl or from a chloroalkoxide precursor of formula $Si(OR)_{4-x}Cl_x$ where R=H, methyl, ethyl, x being comprised between 0 and 4. The silicic precursor can also advantageously be an alkoxide precursor of formula $Si(OR)_{4-x}R'_x$ where R=H, methyl, ethyl and R' is an alkyl chain or a functionalized alkyl chain, for example with a thiol, amino, β diketone, or sulphonic acid group, x being comprised between 0 and 4.

A preferred silicic precursor is tetraethyl orthosilicate (TEOS) of formula $Si(OEt)_4$.

In the preferred case where said mesostructured matrix is constituted by a mixture of silicon oxide and aluminium oxide, at least one silicic precursor and at least one aluminic precursor can be introduced directly in step b) of mixing in solution.

In another preferred case where said mesostructured matrix is constituted by a mixture of silicon oxide and aluminium oxide, only at least one silicic precursor can be introduced in step b) of mixing in solution, and the element aluminium can be introduced by deposition of at least one aluminic precursor on the solid obtained at the end of step e) or at the end of step f). In the case where the aluminic precursor is introduced by deposition on the solid obtained at the end of step f), an additional step of thermal treatment is advantageously carried out between steps f) and g) in order to decompose the aluminic precursor. Said thermal treatment is advantageously carried out under the same conditions as the thermal treatment in step f) described below. The aluminic precursor is advantageously deposited by the usual methods that are well known to a person skilled in the art, for example the methods of dry impregnation or with an excess of solvents.

The aluminic precursor is advantageously an inorganic aluminium salt of formula $AlX_3$, X being a halogen or the $NO_3$ group. Preferably, X is chlorine. The aluminic precursor can also advantageously be an organometallic precursor of formula $Al(OR'')_3$ where R''=ethyl, isopropyl, n-butyl, s-butyl or t-butyl or a chelated precursor such as aluminium acetylacetonate $(Al(CH_7O_2)_3)$. The aluminic precursor can also advantageously be an aluminium oxide or hydroxide.

The solution in which at least one surfactant, at least one polyoxometallate obtained according to step a) and at least one precursor of at least one element Y described above according to step b) of said preparation method, are mixed, can advantageously be acid, basic or neutral. Preferably, said solution is acid or neutral. The acids used for obtaining an acid solution are advantageously selected from hydrochloric acid, sulphuric acid and nitric acid. Said solution can advantageously be aqueous or can advantageously be a water-organic solvent mixture, the organic solvent preferably being a polar solvent, preferably an alcohol, and more preferably the solvent is ethanol. Said solution can also advantageously be practically organic, preferably practically alcoholic, the quantity of water being such that hydrolysis of the inorganic precursors is assured. The quantity of water is therefore preferably stoichiometric. Very preferably, said solution is an acid aqueous solution.

The surfactant used for preparing the mixture in step b) of said method of preparation is an ionic or non-ionic surfactant or a mixture of the two. Preferably, the ionic surfactant is selected from the phosphonium and ammonium ions and very preferably from the quaternary ammonium salts such as cetyltrimethylammonium bromide (CTAB). Preferably, the non-ionic surfactant can be any copolymer possessing at least two parts with different polarities endowing them with properties of amphiphilic macromolecules. These copolymers can comprise at least one block included in the non-exhaustive list of the following families of polymers: fluorinated polymers ($-[CH_2-CH_2-CH_2-CH_2-O-CO-R1-$ with $R1=C_4F_9$, $C_8F_{17}$, etc.), biopolymers such as poly(amino acids) (poly-lysine, alginates, etc.), dendrimers, polymers constituted by chains of poly(alkylene oxide). In general, any copolymer of amphiphilic character known to a person skilled in the art can be used (S. Fröster, M. Antionnetti, Adv. Mater, 1998, 10, 195; S. Fröster, T. Plantenberg, Angew. Chem. Int. Ed, 2002, 41, 688; H. Cölfen, Macromol. Rapid Commun, 2001, 22, 219). Preferably, a block copolymer constituted by poly(alkylene oxide) chains is used. Said block copolymer is preferably a block copolymer having two, three or four blocks, each block being constituted by a poly(alkylene oxide) chain. For a copolymer with two blocks, one of the blocks consists of a poly(alkylene oxide) chain of hydrophilic nature and the other block consists of a poly(alkylene oxide) chain of hydrophobic nature. For a copolymer with three blocks, at least one of the blocks consists of a poly(alkylene oxide) chain of hydrophilic nature whereas at least one of the other blocks consists of a poly(alkylene oxide) chain of hydrophobic nature. Preferably, in the case of a copolymer with three blocks, the poly(alkylene oxide) chains of hydrophilic nature are poly(ethylene oxide) chains designated $(PEO)_x$ and $(PEO)_z$ and the poly(alkylene oxide) chains of hydrophobic nature are poly(propylene oxide) chains designated $(PPO)_y$, poly(butylene oxide) chains, or mixed chains in which each chain is a mixture of several alkylene oxide monomers. Very preferably, in the case of a copolymer with three blocks, a compound of formula $(PEO)_x-(PPO)_y-(PEO)_z$ is used, where x is comprised between 5 and 300 and y is between 33 and 300 and z is comprised between 5 and 300. Preferably, the values of x and z are identical. Very advantageously, a compound in which x=20, y=70 and z=20 (P123) and a compound in which x=106, y=70 and z=106 (F127) are used. The commercial non-ionic surfactants known by the name Pluronic (BASF), Tetronic (BASF), Triton (Sigma), Tergitol (Union Carbide), Brij (Aldrich) can be used as non-ionic surfactants. For a copolymer with four blocks, two of the blocks are constituted by a poly(alkylene oxide) chain of hydrophilic nature and the other two blocks are constituted by a poly(alkylene oxide) chain of hydrophobic nature. Preferably, a mixture of an ionic surfactant such as CTAB and of a non-ionic surfactant such as P123 is used for preparing the mixture in step b) of said method of preparation.

The polyoxometallates described above and having the aforementioned general formula are used in step b) of the method of preparing said mesostructured oxide matrix comprising said polyoxometallates trapped in its walls.

The preferred polyoxometallates used according to the invention are advantageously selected from the polyoxometallates of formula $PVMo_{11}O_{40}^{4-}$, $PV_2Mo_{10}O_{40}^{5-}$, $PV_3Mo_9O_{40}^{6-}$ and $PV_4Mo_8O_{40}^{7-}$, $HPNiMo_{11}O_{40}^{6-}$, $P_2Mo_5O_{23}^{6-}$, $Ni_2Mo_{10}O_{38}H_4^{8-}$, $NiMo_6O_{24}H_6^{4-}$, $PMo_{12}O_{40}^{3-}$, $PW_{12}O_{40}^{3-}$, $PMo_3W_9O_{40}^{3-}$, $PMo_6W_6O_{40}^{3-}$, used alone or in a mixture.

Step c) of said method of preparation consists of a maturation step, i.e. a step in which said colloidal solution obtained at the end of step b) is stored, with stirring, at a temperature comprised between 25° C. and 80° C. and preferably comprised between 25° C. and 40° C. for a period comprised between 1 h and 48 h and preferably comprised between 20 h and 30 h.

A suspension is obtained at the end of the maturation step c).

The optional step d) of said method of preparation consists of optional autoclaving of the suspension obtained at the end of step c). This step consists of putting said suspension in a closed vessel at a temperature comprised between 80° C. and 140° C., preferably comprised between 90° C. and 120° C. and more preferably comprised between 100° C. and 110° C. so as to work at autogenous pressure intrinsic to the operating conditions selected. Autoclaving is maintained for a period comprised between 12 and 48 hours and preferably between 15 and 30 hours.

The suspension obtained at the end of step c) is then filtered according to step e) and the solid thus obtained is washed and dried. The washing of said solid obtained after filtration and before drying is advantageously carried out with a solution of the same nature as the solution used for mixing according to step b) of said method of preparation, and then with an aqueous solution of distilled water.

The drying of said solid obtained after filtration and washing during step e) of said method of preparation is advantageously carried out in an oven at a temperature comprised between 25° C. and 140° C., preferably between 25° C. and 100° C. and more preferably between 30° C. and 80° C. and for a period comprised between 10 and 48 h and preferably between 10 and 24 h.

Step f) then consists of a step of removing said surfactant, leading to the generation of uniform and organized mesoporosity of the mesostructured matrix.

Removal of the surfactant during step f) of said method of preparation in order to obtain the mesostructured matrix used according to the invention is advantageously carried out by thermal treatment and preferably by calcination under air at a temperature comprised between 300° C. and 1000° C. and preferably at a temperature comprised between 400° C. and 600° C. for a period comprised between 1 and 24 hours and preferably for a period comprised between 6 and 20 hours.

Step f) is optionally followed by a step g) of treatment of the solid in order to regenerate, at least partially or completely, the polyoxometallate entity optionally at least partially or completely decomposed during step f). In the case where said polyoxometallate is decomposed completely during step f), said regeneration step g) is obligatory. This step consists advantageously of washing the solid with a polar solvent using a Soxhlet-type extractor. Preferably, the extraction solvent is selected from alcohols, acetonitrile and water. Preferably the solvent is an alcohol and very preferably the solvent is methanol. Said washing is carried out for a period comprised between 1 and 24 hours, and preferably between 1 and 8 hours at a temperature comprised between 65 and 110° C. and preferably comprised between 90 and 100° C.

Extraction with the polar solvent not only makes it possible to reform said polyoxometallates trapped in the walls of said matrix but also to remove said polyoxometallates optionally formed on the surface of said matrix.

In the case where step g) is obligatory, said step g) is followed by step h). Step h) consists of a step of drying of said solid thus obtained, said solid being constituted by said mesostructured oxide matrix comprising said polyoxometallates trapped in its walls. The drying of said solid is advantageously carried out in a kiln or in an oven at a temperature comprised between 40° C. and 140° C., preferably between 40° C. and 100° C. and for a period comprised between 10 and 48 h.

Said mesostructured oxide matrix comprising said polyoxometallates trapped in its walls, used in the process according to the invention, advantageously has a specific surface between 100 and 1000 m²/g and very advantageously between 300 and 500 m²/g.

Said mesostructured oxide matrix comprising said polyoxometallates trapped in its walls, i.e. the catalyst in its oxide form, has a non-uniform shape of each of the elementary particles by which it is constituted, i.e. an irregular and preferably non-spherical shape. Preferably, said elementary particles constituting said matrix comprising said polyoxometallates trapped in its walls are non-spherical.

At the end of the method of preparation by so-called direct synthesis, said elementary particles constituting said matrix comprising said polyoxometallates trapped in its walls advantageously have an average size between 50 nm and 10 μm and preferably between 50 nm and 1 μm.

Other elements can advantageously be added at different steps of the preparation of said mesostructured oxide matrix used in the invention. Said elements are preferably selected from the group VIII elements called promoters, doping elements and organic compounds. Very preferably, said group VIII metal is selected from nickel and cobalt, and more preferably the group VIII metal is constituted only by cobalt or nickel. Even more preferably, the group VIII metal is cobalt. The doping elements are preferably selected from boron, silicon, phosphorus and fluorine, used alone or in a mixture.

Said elements can advantageously be added, alone or in a mixture, during one or more steps of the method of preparing said matrix selected from the following steps i), ii), iii) and iv).

i) Said elements can advantageously be introduced during step b) of the method of preparing said matrix of mixing in solution at least one surfactant, at least one silica precursor, at least one precursor of at least one element Y selected from the group consisting of silicon, aluminium, titanium, zirconium, gallium, and cerium and a mixture of at least one of these elements, then at least one polyoxometallate obtained according to step a) to obtain a colloidal solution.

ii) Said elements can advantageously be introduced after step f) and before step g) of said method of preparation. Said elements can advantageously be introduced by any technique known to a person skilled in the art and advantageously by dry impregnation.

iii) Said elements can advantageously be introduced after the drying step h) of said method of preparation prior to forming. Said elements can advantageously be introduced by any technique known to a person skilled in the art and advantageously by dry impregnation.

iv) Said elements can advantageously be introduced after the step of forming of said matrix. Said elements can advantageously be introduced by any technique known to a person skilled in the art and advantageously by dry impregnation.

After each of the steps ii), iii) or iv) described above, the solid obtained constituted by said mesostructured silica matrix comprising said polyoxometallates trapped in its walls can advantageously undergo a drying step and optionally a calcination step under air optionally enriched with $O_2$ at a temperature comprised between 200 and 600° C. and preferably comprised between 300 and 500° C. for a period comprised between 1 and 12 hours and preferably for a period comprised between 2 and 6 hours.

The sources of group VIII elements that can advantageously be used are well known to a person skilled in the art. Nitrates preferably selected from cobalt nitrate and nickel nitrate, sulphates, hydroxides selected from cobalt hydroxides and nickel hydroxides, phosphates, halides selected from chlorides, bromides and fluorides, carboxylates selected from acetates and carbonates, can advantageously be used as sources of group VIII elements.

The group VIII promoter elements are advantageously present in the catalyst at contents between 0.1 and 10% by weight, preferably between 1 and 7% by weight of oxide relative to the final catalyst.

The doping elements that can advantageously be introduced are advantageously selected from boron, silicon, phosphorus and fluorine, used alone or in a mixture. The doping element is an element that is added, which in itself does not have any catalytic character, but which increases the catalytic activity of the metal(s).

Said doping element can advantageously be introduced, alone or in a mixture, during synthesis of said material used in the invention. It can also be introduced by impregnation of the material used according to the invention before or after drying, before or after re-extraction. Finally, said dopant can be introduced by impregnation of said material used in the invention after forming.

The doping elements are advantageously present in the catalyst used according to the present invention at a content between 0.1 and 10% by weight, preferably between 0.5 and 8% by weight, and even more preferably between 0.5 and 6% by weight of oxide relative to the final catalyst.

The source of boron can advantageously be boric acid, preferably orthoboric acid $H_3BO_3$, ammonium diborate or pentaborate, boron oxide, the boric esters. Boron can also be introduced at the same time as the group VIB element(s) in the form of Keggin, lacunary Keggin, or substituted Keggin heteropolyanions such as for example in the form of boromolybdic acid and salts thereof, or of borotungstic acid and salts thereof during synthesis of said matrix. Boron, when it is not introduced during synthesis of said matrix but post-impregnation, can advantageously be introduced for example by a solution of boric acid in a water/alcohol mixture or also in a water/ethanolamine mixture. Boron can also advantageously be introduced in the form of a mixture of boric acid, hydrogen peroxide and a basic organic compound containing nitrogen such as ammonia, primary and secondary amines, cyclic amines, compounds of the pyridine family and quinolines and compounds of the pyrrole family.

The source of phosphorus can advantageously be orthophosphoric acid $H_3PO_4$, the corresponding salts and esters or the ammonium phosphates. Phosphorus can also advantageously be introduced at the same time as the group VIB element(s) in the form of Keggin, lacunary Keggin, or substituted Keggin or Strandberg-type heteropolyanions such as for example in the form of phosphomolybdic acid and salts thereof, phosphotungstic acid and salts thereof, during synthesis of said matrix. Phosphorus, when it is not introduced during synthesis of said matrix but post-impregnation, can advantageously be introduced in the form of a mixture of phosphoric acid and a basic organic compound containing nitrogen such as ammonia, primary and secondary amines, cyclic amines, compounds of the pyridine family and quinolines and compounds of the pyrrole family.

The sources of fluorine that can advantageously be used are well known to a person skilled in the art. For example, fluoride anions can be introduced in the form of hydrofluoric acid or salts thereof. These salts are formed with alkali metals, ammonium or an organic compound. In the latter case, the salt is advantageously formed in the reaction mixture by reaction between the organic compound and hydrofluoric acid. Fluorine, when it is not introduced during synthesis of said matrix but post-impregnation, can advantageously be introduced for example by impregnation of an aqueous solution of hydrofluoric acid, or of ammonium fluoride or also of ammonium bifluoride.

Once the doping element has been introduced by post-impregnation, a person skilled in the art can advantageously carry out drying at a temperature advantageously comprised between 90 and 150° C. and for example at 120° C., and optionally then to calcination preferably under air in a traversed bed, at a temperature advantageously between 300 and 700° C. and for example at 450° C. for 4 hours.

The organic compounds used as elements promoting the hydrogenating function are preferably selected from chelating agents, non-chelating agents, reducing agents and additives known to a person skilled in the art. Said organic compounds are advantageously selected from optionally etherified mono-, di- or polyols, carboxylic acids, sugars, non-cyclic mono-, di- or polysaccharides such as glucose, fructose, maltose, lactose or sucrose, esters, ethers, crown ethers, compounds containing sulphur or nitrogen such as nitriloacetic acid, ethylenediaminetetraacetic acid, or diethylenetriamine.

Said mesostructured oxide matrix comprising said polyoxometallates trapped in its walls and serving as catalyst support can be obtained in the form of powder, beads, pellets, granules or extrudates, the forming operations being carried out by the conventional techniques known to a person skilled in the art. Preferably, said mesostructured oxide matrix used according to the invention is obtained in the form of powder and is formed into extrudates or beads.

During these forming operations, it is also possible to add, to said mesostructured oxide matrix comprising said polyoxometallates trapped in its walls, at least one porous oxide material preferably selected from the group comprising alumina, silica, silica-alumina, magnesia, clay, titanium oxide, zirconium oxide, lanthanum oxide, cerium oxide, aluminium phosphates, boron phosphates, or a mixture of at least two of the aforementioned oxides and the combinations alumina-boron oxide, and the alumina-titania, alumina-zirconia and titania-zirconia mixtures. It is also possible to add aluminates, for example magnesium, calcium, barium, manganese, iron, cobalt, nickel, copper and zinc aluminates, mixed aluminates such as for example those containing at least two of the metals mentioned above. It is also advantageously possible to add titanates, for example zinc, nickel, cobalt titanates. It is also advantageously possible to use mixtures of alumina and silica and mixtures of alumina with other compounds such as for example the group VIB elements, phosphorus, fluorine or boron. It is also possible to use synthetic or natural simple clays of the dioctahedral phyllosilicate 2:1 type or trioctahedral phyllosilicate 3:1 type such as kaolinite, antigorite, chrysotile, montmorillonite, beidellite, vermiculite, talc, hectorite, saponite, Laponite. These clays can optionally be delaminated. It is also advantageously possible to use mixtures of alumina and clay and mixtures of silica-alumina and clay. During these forming operations, it is also possible to add, to said mesostructured oxide matrix comprising said polyoxometallates trapped in its walls, at least one zeolite crystal. Said zeolite crystals advantageously have a pore size comprised between 0.2 and 2 nm, preferably between 0.2 and 1 nm and very preferably between 0.2 and 0.8 nm. Said zeolite crystals advantageously represent from 0.1 to 30% by weight, preferably from 0.1 to 20% by weight and very preferably from 0.1 to 10% by weight of said mesostructured oxide matrix comprising said polyoxometallates. Any zeolite and in particular, but not limited to, those listed in "Atlas of zeolite framework types", $6^{th}$ revised Edition, 2007, Ch. Baerlocher, L. B. L. McCusker, D. H. Olson can advantageously be used in this forming. The zeolite crystals preferably comprise at least one zeolite selected from the zeolites IZM-2, ZSM-5, ZSM-12, ZSM-48, ZSM-22, ZSM-23, ZBM-30, EU-2, EU-11, silicalite, beta, zeolite A, faujasite, Y, USY, VUSY, SDUSY, mordenite, NU-10, NU-87, NU-88, NU-86, NU-85, IM-5, IM-12, IM-16, ferrierite and EU-1. Very preferably, the zeolite crystals comprise at least one zeolite selected from the zeolites of the structural type MFI, BEA, FAU, and LTA. Crystals of different zeolites and in particular of zeolites of a different structural type can be added to said mesostructured oxide matrix comprising said polyoxometallates. In particular, said mesostructured oxide matrix comprising said polyoxometallates can comprise, after forming, and advantageously, at least first zeolite crystals where the zeolite is selected from the zeolites IZM-2, ZSM-5, ZSM-12, ZSM-48, ZSM-22, ZSM-23, ZBM-30, EU-2, EU-11, silicalite, beta, zeolite A, faujasite, Y, USY, VUSY, SDUSY, mordenite, NU-10, NU-87, NU-88, NU-86, NU-85, IM-5, IM-12, IM-16, ferrierite and EU-1, preferably from the zeolites of structural type MFI, BEA, FAU, and LTA and at least second zeolite crystals where the zeolite is different from that of the first zeolite crystals and is selected from the zeolites IZM-2, ZSM-5, ZSM-12, ZSM-48, ZSM-22, ZSM-23, ZBM-30, EU-2, EU-11, silicalite, beta, zeolite A, faujasite, Y, USY, VUSY, SDUSY, mordenite, NU-10, NU-87, NU-88, NU-86, NU-85, IM-5, IM-12, IM-16, ferrierite and EU-1, preferably from the zeolites of structural type MFI, BEA, FAU, and LTA. The zeolite crystals advantageously comprise at least one zeolite either entirely silicic or containing, besides silicon, at least one element T selected from aluminium, iron, boron, indium, gallium and germanium, preferably aluminium.

Said mesostructured oxide matrix comprising said polyoxometallates trapped in its walls is characterized by several analytical techniques and in particular by small-angle X-ray diffraction (small-angle XRD), by wide-angle X-ray diffraction (XRD), by nitrogen volumetry (BET), by transmission electron microscopy (TEM) optionally coupled to X-ray analysis, by scanning electron microscopy (SEM), by X-ray fluorescence (XRF) and by any technique known to a person skilled in the art for characterizing the presence of polyoxometallates such as Raman spectroscopy in particular, UV-visible spectroscopy or infrared spectroscopy as well as microanalyses. Techniques such as nuclear magnetic resonance (NMR) or electron paramagnetic resonance (EPR) (in particular when using reduced heteropolyanions), can also be used depending on the type of heteropolyanions used.

At the end of the method of preparation described above, the catalyst, in its oxide form, is presented in the form of a solid constituted by a mesostructured oxide matrix comprising said polyoxometallates trapped in its walls.

According to the invention, said catalyst, in its oxide form, is sulphurized before being used in the hydrodesulphurization process according to the invention.

This sulphurization step generates the active sulphide phase. In fact, the transformation of at least one polyoxometallate trapped in the mesostructured oxide matrix into its associated sulphurized active phase is advantageously carried out by sulphurization, i.e. by a thermal treatment of said matrix in contact with a sulphur-containing organic compound that is decomposable and generates $H_2S$ or directly in contact with a gaseous stream of $H_2S$ diluted in $H_2$ at a temperature comprised between 200 and 600° C. and preferably comprised between 300 and 500° C. according to methods well known to a person skilled in the art. More precisely, sulphurization is carried out 1) in a unit of the process itself by means of the feedstock to be treated in the presence of hydrogen and of hydrogen sulphide ($H_2S$) introduced as it is or resulting from the decomposition of a sulphur-containing organic compound, which is called in-situ sulphurization or 2) prior to loading the catalyst into the unit, it is then called ex-situ sulphurization. In the case of ex-situ sulphurization, gas mixtures can advantageously be used such as the mixtures $H_2/H_2S$ or $N_2/H_2S$. The catalyst in its oxide form can also advantageously be sulphurized ex-situ starting from model compounds in the liquid phase, the sulphurizing agent then being selected from dimethyldisulphide (DMDS), dimethylsulphide, n-butylmercaptan, the polysulphide compounds of the tert-nonylpolysulphide type, the latter being used in an organic matrix composed of aromatic or alkyl molecules.

Before said sulphurization step, said catalyst in its oxide form constituted by a mesostructured oxide matrix comprising said polyoxometallates trapped in its walls can advantageously be pretreated thermally by methods well known to a person skilled in the art, preferably by calcination under air at a temperature comprised between 300 and 1000° C. and preferably at a temperature comprised between 500 and 600° C. for a period comprised between 1 and 24 hours and preferably for a period comprised between 6 and 15 hours.

According to a preferred embodiment, the polyoxometallates trapped in the walls of said mesostructured oxide matrix can advantageously be sulphurized partially or completely at the time of preparation by direct synthesis of said mesostructured oxide matrix comprising said polyoxometallates used according to the invention and preferably during step b) of said method of preparation, by introducing into the solution, in addition to at least one surfactant, at least one polyoxometallate and at least one precursor of element Y, sulphur-containing precursors advantageously selected from thiourea, thioacetamide, mercaptans, sulphides and disulphides. Low-temperature decomposition, i.e. at a temperature comprised between 80 and 90° C., of said sulphur-containing precursors, either during the maturation step c) or during the autoclaving step d), leads to the formation of $H_2S$, thus permitting sulphurization of said polyoxometallates.

According to another preferred embodiment, partial or complete sulphurization of said polyoxometallates can advantageously be carried out by introduction of said sulphur-containing precursors in step g) of partial or complete regeneration of said polyoxometallates trapped in said mesostructured oxide matrix of the catalyst used in the invention.

The hydrocracking process according to the invention is advantageously carried out in the presence of one or more hydrocracking catalyst(s) described according to the invention in one or more reaction unit(s) equipped with one or more reactor(s). The hydrocracking process according to the invention can advantageously be implemented in one or more fixed bed reactor(s) or in one or more ebullating bed reactor(s).

A preliminary step of hydrotreating or hydrorefining said hydrocarbon-containing feedstock is advantageously implemented in the hydrocracking process according to the invention upstream of at least one hydrocracking catalyst described according to the invention and permitting hydrocracking of the feedstock. Said step of hydrotreating or hydrorefining makes it possible to reduce the content of sulphur, nitrogen and oxygenated compounds present in the feedstock to be treated before said feedstock is brought into contact with the hydrocracking catalyst, located downstream so as to avoid its deactivation.

At least one hydrotreating or hydrorefining catalyst can advantageously be used in said preliminary step of hydrotreating or of hydrorefining. Said hydrotreating or hydrorefining catalyst, alone or in combination with another conventional hydrorefining catalyst, located upstream of the catalyst described according to the invention used in the hydrocracking process according to the invention, advantageously comprises at least one group VIII element and/or at least one group VIB element and optionally at least one doping element selected from phosphorus, boron and silicon and an alumina or silica-alumina support.

In a preferred embodiment, said catalyst described according to the invention is advantageously used in said preliminary step of hydrotreating or hydrorefining, said catalyst used in said preliminary step of hydrotreating or hydrorefining being able to be identical to or different from that used in the hydrocracking process according to the invention located downstream and said catalyst preferably being different.

In the preferred case where said catalyst described according to the invention is advantageously used in said preliminary step of hydrotreating or of hydrorefining, said catalyst comprises a mesostructured matrix constituted by silicon oxide.

In a preferred embodiment, the hydrocracking process according to the invention is implemented in a so-called one-step process. So-called "one-step" hydrocracking generally comprises firstly a deep hydrorefining for the purpose of deep hydrodenitrogenation and deep hydrodesulphurization of the feedstock before the latter is sent onto the hydrocracking catalyst(s). This deep hydrorefining of the feedstock only leads to limited conversion of the feedstock, into lighter fractions, which remains insufficient and must therefore be completed on the more active hydrocracking catalyst(s). However, no separation of the effluents occurs between the two types of catalysts: all of the effluent leaving the hydrorefining catalyst bed is injected onto the catalyst bed(s) containing said catalyst(s) and it is only then that the products formed are separated. So-called "one-step" hydrocracking has a variant with recycling of the unconverted fraction to at least one of the hydrocracking catalyst beds for deeper conversion of the feedstock.

In another preferred embodiment, the hydrocracking process according to the invention is implemented in a so-called two-step process. So-called "two-step" hydrocracking comprises a first step with the aim, as in the "one-step" process, of carrying out hydrorefining of the feedstock, but also of reaching a conversion of the latter generally of the order of 40 to 60%. The effluent originating from the first hydrorefining step then undergoes separation, generally by distillation, generally called intermediate separation, the aim of which is to separate the products of conversion from the unconverted fraction. In the second step of the two-step hydrocracking process, only the fraction of the feedstock that was not converted in the first step is treated. This separation allows the two-step hydrocracking process to be more selective for middle distillate (kerosene+diesel) than the one-step process. In fact, intermediate separation of the products of conversion avoids "over-cracking" them to naphtha and gases in the second step on the hydrocracking catalyst(s) obtained according to the method of preparation described above in the present description.

Operating Conditions

The hydrocracking process according to the invention is implemented under operating conditions (temperature, pressure, degree of hydrogen recycling, hourly space velocity) that can be very variable depending on the nature of the feedstock, the quality of the desired products and the plant at the refiner's disposal. The hydrocracking process according to the invention advantageously takes place at a temperature above 200° C., preferably comprised between 250 and 480° C., preferably comprised between 320 and 450° C. and more preferably comprised between 330 and 435° C., under a pressure above 1 MPa, preferably comprised between 2 and 25 MPa and preferably comprised between 3 and 20 MPa, the space velocity (volume flow of feedstock divided by the volume of the catalyst) being comprised between 0.1 and 20 h$^{-1}$, preferably between 0.1 and 6 h$^{-1}$, and more preferably between 0.2 and 3 h$^{-1}$, and the quantity of hydrogen introduced is such that the volume ratio liter of hydrogen/liter of hydrocarbon is comprised between 80 and 5000 l/l and preferably between 100 and 2000 l/l.

These operating conditions used in the hydrocracking process according to the invention generally make it possible to reach conversions per pass, in products having boiling points of at most 370° C. and advantageously of at most 340° C., above 15% and even more preferably comprised between 20 and 95%.

The hydrocracking process according to the invention covers the ranges of pressure and of conversion ranging from mild hydrocracking to high-pressure hydrocracking. By mild hydrocracking is meant hydrocracking leading to moderate conversions, preferably below 40%, and operating at low pressure, preferably comprised between 2 MPa and 10 MPa. By high-pressure hydrocracking is meant hydrocracking leading to high conversions, preferably above 40%, and operating at high pressure, preferably comprised between 10 MPa and 25 MPa.

EXAMPLES

The examples given below describe the invention in more detail but without limiting its scope.

Example 1

Preparation of a Mesostructured Alumina-Silica Material a with Molar Ratio Si/Al=10 of Type AISBA-15

2.0 g of F127 (PEO$_{70}$PPO$_{106}$PEO$_{70}$) is dispersed in 75 ml of an aqueous solution of hydrochloric acid at 0.01 mol/l under stirring. 3.89 g of tetraethyl orthosilicate (Si(OEt)$_4$, TEOS) is added to the homogeneous solution followed by stirring at 40° C. for 24 hours. 0.46 g of Al(O$^t$Bu)$_3$ is added to the homogeneous solution and the whole is stirred at 40° C. for 24 hours. The suspension thus obtained is then poured into a 250-ml Teflon-coated autoclave and left at 100° C. for 24 hours. The solid is then filtered. The powder is then dried in air at 100° C. and then calcined at 550° C. under air for 4 h in order to decompose the polymers and thus release the porosity. The solid B has textural properties (specific surface, pore volume, pore diameter) of (703 m$^2$/g, 1.1 ml/g, 6.8 nm) respectively.

Example 2 (Not According to the Invention)

Preparation of Comparative Catalyst B1, of Formulation NiWP Based on Nickel, Tungsten and Phosphorus Deposited by Dry Impregnation of the Mesostructured Alumina-Silica Support A with a Solution Containing the Keggin Heteropolyacid of Formula PW$_{12}$O$_{40}$$^{3-}$.3H$^+$ or Phosphotungstic Acid, then by Post-Impregnation of a Nickel Precursor The Keggin heteropolyacid of formula PW$_{12}$O$_{40}$$^{3-}$.3H+ from Aldrich is solubilized in water. The catalyst B1 is prepared according to the method consisting of carrying out dry impregnation of the mesostructured aluminosilicate support (support A) with an aqueous solution containing the solubilized Keggin heteropolyacid of formula PW$_{12}$O$_{40}$$^{3-}$.3H$^+$.

After a maturation step in a closed vessel at ambient temperature, the impregnated support is dried at 120° C. for 12 h under a stream of dry air. Said impregnated and dried support is then post-impregnated by the so-called dry impregnation method, with a solution of nickel nitrate Ni(NO$_3$)$_2$.6H$_2$O diluted in water. The quantity of nickel is adjusted so as maintain the molar ratio Ni/W=0.4. This post-impregnation is followed by a maturation step of 12 hours and then drying at 120° C. overnight.

The final contents expressed in % by weight of oxides NiO, WO$_3$ and P$_2$O$_5$ are 3.2/25/0.63 respectively, so that the molar ratio Ni/W=0.39. Catalyst B1 has textural properties (specific surface, pore volume, pore diameter) of (350 m$^2$/g, 0.7 ml/g, 7 nm) respectively.

The catalyst B1 obtained was analysed by Raman spectroscopy. This shows bands at 1011 and 987 cm$^{-1}$, as well as the secondary bands at 518 and 216 cm$^{-1}$ characteristic of the Keggin heteropolyanion of formula PW$_{12}$O$_{40}$$^{3-}$ consistent with earlier results published by B. Qiu, X. Yi, L. Lin, W. Fang and H. Wan in Catalysis Today, 2008, 131, 1-4, 2008, 464.

Example 3 (According to the Invention)

Preparation of Catalyst B2 According to the Invention of Formulation NiWP Comprising the Keggin Heteropolyacid of Formula PW$_{12}$O$_{40}$$^{3-}$.3H$^+$ or Phosphotungstic Acid Trapped in a Mesostructured Alumina-Silica Matrix of Molar Ratio Si/Al=10

0.1 g of CTAB and 2.0 g of P123 are dissolved in 62.5 g of an aqueous solution of hydrochloric acid at 1.9 mol/l. 3.71 of TEOS and 0.44 g of Al(O$^t$Bu)$_3$ are then added, then the mixture is stirred for 45 min. 0.348 g of the Keggin heteropolyacid of formula PW$_{12}$O$_{40}$$^{3-}$. 3H$^+$ from Aldrich in 10 g of the same solution of hydrochloric acid is then added.

The colloidal solution obtained is then stirred for 20 hours at 40° C. The suspension is transferred to a Teflon-coated autoclave for treatment at a temperature of 100° C. for 24 hours. The suspension thus obtained is then filtered and then the solid, after washing with 30 ml of the solution of hydrochloric acid at 1.9 mol/l and 60 ml of distilled water, is dried overnight in an oven at 40° C. The solid obtained is then calcined at a plateau temperature of 490° C. for 19 hours in order to remove the surfactants and release the mesoporosity of said solid. The solid obtained is then placed in a Soxhlet-type extractor and the system is refluxed in the presence of methanol for 4 hours so as to completely regenerate the heteropolyanion that was decomposed during the calcination step. The solid is then dried in order to remove the solvent at a temperature of 90° C. for 12 hours.

The solid obtained, constituted by the mesostructured alumina-silica matrix comprising the Keggin heteropolyanion of formula PW$_{12}$O$_{40}$$^{3-}$ trapped in its walls, is then dry-impregnated with a solution of nickel nitrate and then dried at 120° C. for 12 hours to remove the water. The final contents expressed in % by weight of oxides NiO, WO$_3$ and P$_2$O$_5$ are 2.8/21.7/0.55 respectively relative to the final solid, so that the molar ratio Ni/W=0.4. Catalyst B2 has textural properties (specific surface, pore volume, pore diameter) of (288 m$^2$/g, 0.9 ml/g, 9 nm) respectively.

The catalyst B2 obtained was analysed by Raman spectroscopy. This shows bands at 1012 and 989 cm$^{-1}$, as well as the secondary bands at 518 and 216 cm$^{-1}$ characteristic of the Keggin heteropolyanion of formula $PW_{12}O_{40}^{3-}$ in agreement with earlier results published by B. Qiu, X. Yi, L. Lin, W. Fang and H. Wan in Catalysis Today, 2008, 131, 1-4, 2008, 464.

Example 4 (Not According to the Invention)

Preparation of Comparative Catalyst C1, of Formulation NiMoWP Based on Nickel, Molybdenum, Tungsten and Phosphorus Deposited by Dry Impregnation of the Mesostructured Alumina-Silica Support A with a Solution Containing the Ke in Heterool Anion of Formula $PMo_3W_9O_{40}^{3-}.3H^+$ and a Nickel Precursor Tungsten, molybdenum and nickel are co-impregnated dry in aqueous medium on support A (380 m$^2$/g). The impregnating solution is prepared beforehand by mixing $PW_{12}O_{40}^{3-}.3H^+$, $MoO_3$ and $H_3PO_4$ refluxed at 90° C. in water for 3 h, which makes it possible to obtain the Keggin heteropolyanion of formula $PMo_3W_9O_{40}^{3-}.3H^+$ dissolved in the solution. $Ni_5(CO_3)_2(OH)_6.4H_2O$ is added to this solution, in such a way that the quantity is added in order to obtain an Ni/(Mo+W) ratio=0.2. After maturation for 12 hours, the catalyst is dried at 120° C. overnight. Of this non-sulphurized catalyst NiMoWP/SiAl, the content by weight of tungsten oxide is 20%, the content by weight of molybdenum oxide is 4% and the content by weight of nickel oxide is 1.8% and the content of phosphorus oxide is 0.7% relative to the total weight of the solid, which corresponds to a true Ni/(Mo+W) ratio of 0.2.

The catalyst obtained was analysed by Raman spectroscopy. This shows main bands at 1000, 986 and 978 cm$^{-1}$, as well as the secondary bands at 516, 236 and 222 cm$^{-1}$ characteristic of the Keggin heteropolyanion of formula $PMo_3W_9O_{40}^{3-}$. Catalyst C1 has textural properties (specific surface, pore volume, pore diameter) of (360 m$^2$/g, 0.7 ml/g, 7 nm) respectively.

Example 5 (According to the Invention)

Preparation of Catalyst C2 According to the Invention of Formulation NiMoWP Comrisin the Heterool Anion $PMo_3W_9O_{40}^{3-}$ Trapped in a Mesostructured Aluminosilicate Matrix of Molar Ratio Si/Al=10

0.040 g of molybdenum trioxide $MoO_3$ is dissolved in an aqueous solution of 0.009 g of phosphoric acid $H_3PO_4$, then 0.198 g of the Keggin heteropolyacid of formula $PW_{12}O_{40}^{3-}.3H^+$ from Aldrich is added to the solution. After stirring for 12 hours, the clear solution 51 containing the Keggin heteropolyanion of formula $PMo_3W_9O_{40}^{3-}$ is obtained. 0.1 g of CTAB and 2.0 g of P123 are dissolved in 62.5 g of a solution of hydrochloric acid at 1.9 mol/l. 3.71 g of TEOS and 0.44 g of $Al(O^tBu)_3$ are then added, then the mixture is stirred for 45 min. The solution S1 prepared, containing the heteropolyacid $PMo_3W_9O_{40}^{3-}.3H^+$, is added to the preceding mixture.

The colloidal solution obtained is then stirred for 20 hours at 40° C. The suspension is transferred to a Teflon-coated autoclave for treatment at a temperature of 100° C. for 24 hours. The suspension thus obtained is then filtered, then the solid, after washing with 30 ml of the solution of hydrochloric acid at 1.9 mol/l and 60 ml of distilled water, is dried overnight in an oven at 40° C. The solid obtained is then calcined at a plateau temperature of 490° C. for 19 hours in order to remove the surfactants and to release the mesoporosity of said solid. The solid obtained is then placed in a Soxhlet-type extractor and the system is refluxed in the presence of methanol for 4 hours so as to completely regenerate the heteropolyanion that decomposed during the calcination step. The solid is then dried in order to remove the solvent at a temperature of 90° C. for 12 hours.

The solid obtained, constituted by the mesostructured aluminosilicate matrix SBA-15 comprising the Keggin heteropolyanion of formula $PMo_3W_9O_{40}^{3-}$ trapped in its walls, is then dry-impregnated with a solution of nickel nitrate, then dried at 120° C. for 12 hours in order to remove the water. The final contents expressed in % by weight of oxides NiO, $MoO_3$, $WO_3$ and $P_2O_5$ are 1.5/3.4/17//0.6 respectively relative to the final solid. Catalyst B2 has textural properties (specific surface, pore volume, pore diameter) of (301 m$^2$/g, 0.9 ml/g, 8.8 nm) respectively.

The catalyst obtained was analysed by Raman spectroscopy. This shows main bands at 1000, 986 and 978 cm$^{-1}$, as well as the secondary bands at 516, 236 and 222 cm$^{-1}$ characteristic of the Keggin heteropolyanion of formula $PMo_3W_9O_{40}^{3-}$.

The formulations of the catalysts are described in Table 1.

TABLE 1

Formulation of the catalysts according to the invention and not according to the invention

| Catalyst | Support | NiO (% by weight) | MoO$_3$ (% by weight) | WO$_3$ (% by weight) | P$_2$O$_5$ (% by weight) | Molar ratio Ni/(Mo + W) or Ni/W |
|---|---|---|---|---|---|---|
| B1 (not according to the invention) | Impregnation of $PW_{12}O_{40}^{3-}\cdot 3H^+$ on mesostructured SiAl + post-impregnation with Ni | 3.2 | — | 25 | 0.63 | 0.39 |
| B2 (according to the invention) | $PW_{12}O_{40}^{3-}\cdot 3H^+$ trapped in a mesostructured SiAl + post-impregnation with Ni | 2.8 | — | 21.7 | 0.55 | 0.40 |
| C1 (not according to the invention) | Impregnation of $PMo_3W_9O_{40}^{3-}$ and of Ni on mesostructured SiAl | 1.8 | 4 | 20 | 0.7 | 0.20 |
| C2 (according to the invention) | $PMo_3W_9O_{40}^{3-}$ trapped in a mesostructured SiAl + post-impregnation with Ni | 1.5 | 3.4 | 17 | 0.6 | 0.20 |

Before loading into the unit, the catalysts are conditioned: catalysts B1, 01, B2 and C2 are in fact in the form of powder. These powders are formed: they are pelletized, and crushed, only keeping the particles with granulometry comprised between 1 and 2 mm.

Example 6

Evaluation of catalysts B1 and C1 (not according to the invention) and B2 and C2 (According to the Invention) in Hydrogenation of Toluene in the Presence of Aniline The purpose of the test of Hydrogenation of Toluene in the presence of Aniline ("HTA" test) is to evaluate the HYDrogenating activity (HYD) of the supported sulphurized catalysts in the presence of $H_2S$ and under hydrogen pressure. The isomerization and cracking that characterize the acid function of a hydrocracking catalyst are inhibited by the presence of $NH_3$ (resulting from decomposition of the aniline) so that the HTA test makes it possible to specifically assess the hydrogenating power of each of the catalysts. The aniline and/or $NH_3$ will thus react via an acid-base reaction with the acid sites of the support. Each HTA test was conducted on a unit having several microreactors in parallel. For each "HTA" test, the same feedstock is used for the sulphurization of the catalyst and for the actual catalytic test phase. 4 $cm^3$ of catalyst mixed with 4 $cm^3$ of carborundum (SiC, 500 µm) is loaded into the reactors. The feedstock used for this test is as follows:

Toluene 20% by weight,
Cyclohexane 73.62% by weight,
DMDS (DiMethylDiSulphide) 5.88% by weight (3.8% by weight of S),
Aniline 0.5% by weight (750 ppm N).

The catalyst is loaded into the reactor in its inactive oxide form. Activation (sulphurization) is carried out in the unit with this same feedstock. It is $H_2S$ which, formed as a result of decomposition of the DMDS, sulphurizes the oxide phase. The quantity of aniline present in the feedstock was selected to obtain, after decomposition, about 750 ppm of $NH_3$. The operating conditions of the toluene hydrogenation test are as follows:

P=6 MPa,
LHSV=2 $h^{-1}$ (feedstock flow rate=8 $cm^3/h$),
$H_2$/HC=450 $Nm^3/m^3$ ($H_2$ flow rate=3.6 $Nm^3/m^3$),
T=350° C.

The percentage of toluene converted is measured and the catalytic results are expressed in intrinsic rate of hydrogenation, i.e. the number of molecules of toluene converted per atom of Mo+W per hour.

The activity of catalyst B1 is taken as the reference and is equal to 100. The results obtained are presented in Table 2.

TABLE 2

Relative intrinsic rates of hydrogenation of catalysts B1, B2, C1 and C2

| Catalyst | Hydrogenating activity (base 100 for catalyst B1) |
|---|---|
| B1 not according to the invention (Impregnation of $PW_{12}O_{40}^{3-} \cdot 3H^+$ on mesostructured SiAl + post-impregnation with Ni) | 100 |

TABLE 2-continued

Relative intrinsic rates of hydrogenation of catalysts B1, B2, C1 and C2

| Catalyst | Hydrogenating activity (base 100 for catalyst B1) |
|---|---|
| B2 according to the invention ($PW_{12}O_{40}^{3-} \cdot 3H^+$ trapped in a mesostructured SiAl + post-impregnation with Ni) | 139 |
| C1 not according to the invention (Impregnation of $PMo_3W_9O_{40}^{3-}$ and of Ni on mesostructured SiAl) | 130 |
| C2 according to the invention ($PMo_3W_9O_{40}^{3-}$ trapped in a mesostructured SiAl + post-impregnation with Ni) | 172 |

The results given in Table 2 demonstrate that catalysts B2 and C2 according to the invention display an intrinsic rate of hydrogenation that is also greatly improved relative to that of catalysts B1 and C1 respectively, prepared by dry impregnation, to which they are directly comparable.

Example 7

Evaluation of Catalysts C1 (not According to the Invention) and C2 (According to the Invention) in Mild Hydrocracking of a Vacuum Distillate Cut The feedstock used is a feedstock of the vacuum distillate type "VD" previously hydrotreated using a catalyst of formulation NiMoP supported on alumina marketed by the company Axens. The main characteristics of the feedstock are shown in Table 3.

TABLE 3

Characteristics of the VD used for mild hydrocracking

| Feedstock | VD |
|---|---|
| Density $_{15/4}$ (g/$cm^3$) | 0.898 |
| organic S (% by weight) | 0.2504 |
| organic N (ppm) | 351 |
| WAT* (° C.) | 475 |
| % by weight compounds having a boiling point comprised between 340° C. and 540° C. | 85 |

*Weighted average temperature = $\dfrac{1T_{5\%} + 2T_{50\%} + 4T_{95\%}}{7}$ with $T_{x\%}$ corresponding to the boiling point of the x % by weight hydrocarbon compounds present in the liquid cut.

Catalysts C1 and C2 formed as crushed particles with granulometry comprised between 1 and 2 mm are tested in succession. For each test, 4 $cm^3$ of catalyst is loaded into the reactor. Activation (sulphurization) is carried out in the reaction unit before starting the test with a so-called sulphurization feedstock (direct distillation gas oil+2% by weight DMDS). It is $H_2S$ which, formed as a result of decomposition of the DMDS, sulphurizes the catalysts C1 and C2.

The operating conditions applied in the mild hydrocracking test are as follows:

P=6 MPa,
LHSV=0.6 $h^{-1}$, $H_2/HC_{outlet}$=480 Nm$^3$/m$^3$,
T=390° C.

The catalytic results are summarized in Table 4. The crude conversion corresponds to the conversion of the hydrocarbon fraction having a boiling point above 370° C. present in the initial VD feedstock into hydrocarbons having a boiling point below 370° C. and present in the effluent. The crude conversion is determined as being equal to the fraction by weight constituted by the hydrocarbons having a boiling point below 370° C. and present in the effluent.

TABLE 4

Catalytic performance obtained for C1 and C2 in mild hydrocracking

|  | Crude conversion (%) | Total sulphur in the effluent (ppm) |
|---|---|---|
| C1 (not according to the invention) | 39 | 27 |
| C2 (according to the invention) | 40 | 25 |

The catalyst C2 prepared according to the invention and comprising heteropolyanions trapped in a mesostructured alumina-silica matrix displays a conversion of the 370+ cut into the 370− cut equivalent or even very slightly higher and a hydrodesulphurization activity equivalent to that of catalyst C1 prepared by conventional dry impregnation, whereas catalyst C2 contains 15% fewer Mo and W atoms relative to catalyst C1. These results show that potentially, the active phase of catalyst C2, originating from the sulphurization of the heteropolyanions trapped in a mesostructured alumina-silica matrix, is better dispersed, thus generating a larger number of active sites per quantity of sulphide active phase.

Example 8

Evaluation of Catalysts B1 and B2 in High-Pressure Hydrocracking of a Vacuum Distillate Catalysts B1 and B2, the preparation of which is described in Examples 1, 2 and 3, are used for carrying out the hydrocracking of a vacuum distillate that has not been hydrotreated, the main characteristics of which are shown in Table 5.

TABLE 5

Characteristics of the vacuum distillate that has not been hydrotreated

| Density at 15° C. | 0.9217 |
|---|---|
| Sulphur (% by weight) | 2.5 |
| Nitrogen (ppm by weight) | 835 |
| % by weight compounds having a boiling point comprised between 340° C. and 540° C. | 85 |

Catalysts B1 and B2 were used according to the process of the invention using a pilot unit having one traversed fixed bed reactor, the fluids circulating from top to bottom (down-flow). Before the hydrocracking test, the catalysts are sulphurized at 14 MPa, at 350° C. by means of a direct distillation gas oil to which 2% by weight DMDS (dimethyl disulphide) is added.

After sulphurization, the catalytic tests were carried out under the following conditions:
total pressure: 14 MPa,
hydrogen flow rate: 1000 liters of gaseous hydrogen per liter of feedstock injected,
space velocity (LHSV): 0.66 h$^{-1}$,
temperature: 400° C.

The catalytic performances are expressed in terms of crude conversion of the 370+ cut (molecules whose boiling point is above 370° C.) to the 370− cut (molecules the boiling point of which is below 370° C.) and crude selectivity for middle distillates (150-370° C. cut). The conversion and selectivity are expressed on the basis of the results of simulated distillation and analyses of the gases by gas chromatography.

The crude conversion to products having a boiling point below 370° C., designated CC 370° C., is taken as being equal to the percentage by weight of molecules the boiling point of which is below 370° C. in the CC 370° C. effluents=% of 370° C.$^-_{effluents}$ The crude selectivity for middle distillates (cut whose boiling points are comprised between 150 and 370° C. is designated CS MD and is taken as being equal to: CS MD=[(fraction of 150-370$_{effluents}$)]/[(% of 370° C.$^-_{effluents}$)].

The catalytic performance obtained is shown in Table 6 below.

TABLE 6 catalytic results of catalysts B1 and B2 in high-pressure hydrocracking

| Catalyst | CC 370° C. (in %) | CS MD in % |
|---|---|---|
| B1 | 71 | 71 |
| B2 | 72 | 71 |

The above examples therefore show the great benefit of using a catalyst according to the invention for carrying out high-pressure hydrocracking of hydrocarbon-containing feedstocks of the vacuum distillate type. In fact, the catalyst according to the invention makes it possible to obtain high conversions of the feedstock and selectivities for middle distillates as advantageous as those of the reference catalyst B1, whereas catalyst B2 according to the invention comprising heteropolyanions trapped in a mesostructured alumina-silica matrix contains 13% fewer W atoms relative to catalyst B1. This good catalytic performance can be attributed to better dispersion of the active phase after sulphurization, which leads to a gain in the number of active sites in the case of catalyst B2.

The invention claimed is:
1. A process for hydrocracking at least one hydrocarbon-containing feedstock, in which at least 50% by weight of the compounds boil between 340° C. and 540° C., by a catalyst comprising, in its oxide form, at least one metal selected from the group consisting of the metals of group VIB, the metals of group VIII and the metals of group VB of the periodic table, alone or in a mixture, said metals being present in the form of at least one polyoxometallate of formula $(H_hX_xM_mO_y)^{q-}$ in which X is an element selected from the group consisting of phosphorus (P), silicon (Si), boron (B), nickel (Ni) and cobalt (Co), said element being alone, M is one or more element(s) selected from the group consisting of vanadium (V), niobium (Nb), tantalum (Ta), molybdenum (Mo), tungsten (W), nickel (Ni) and cobalt (Co), O is oxygen, H is hydrogen, h is an integer between 0 and 12, x is an integer between 0 and 4, m is an integer equal to 5, 6, 7, 8, 9, 10, 11, 12 or 18, y is an integer between 17 and 72 and q is an integer between 1 and 20, said polyoxometallates being present within a mesostructured matrix based on oxide of at least one element Y selected from the group consisting of silicon, aluminium, titanium, zirconium, gallium, and cerium and a mixture of at least one of these elements, said matrix having a pore size between 1.5 and 50 nm and having amorphous walls of thickness between

1 and 30 nm, said polyoxometallates present within said matrix are trapped in the walls of said matrix, said catalyst having been sulphurized.

2. The process according to claim 1, in which said feedstock is a vacuum distillate cut.

3. The process according to claim 1, in which said at least one hydrocarbon-containing feedstock is of the vacuum distillate type or a vacuum distillate mixed with other hydrocarbon cuts selected from the group consisting of effluents originating from a catalytic cracking unit FCC, light gas oils originating from a catalytic cracking unit or a heavy oil cut, distillates originating from fixed bed or ebullating bed processes of desulphurization or of hydroconversion of atmospheric residues and/or of vacuum residues, paraffinic effluents originating from Fischer-Tropsch synthesis, effluents originating from vacuum distillation, deasphalted oils or DAO, effluents originating from a coal liquefaction process, feedstocks originating from biomass or effluents derived from conversion of feedstocks obtained from biomass, and aromatic extracts and feedstocks obtained from units for extraction of aromatics, or a mixture thereof.

4. The process according to claim 1, in which the polyoxometallates are compounds corresponding to the formula $(H_hX_xM_mO_y)^{q-}$, in which h is an integer between 0 and 6, x is an integer equal to 0, 1 or 2, m is an integer equal to 5, 6, 7, 9, 10, 11 or 12, y is an integer between 17 and 48 and q is an integer between 3 and 12, X is an element selected from the group consisting of phosphorus (P), silicon (Si), boron (B), nickel (Ni) and cobalt (Co), said element being alone, M is one or more element(s) selected from the group consisting of vanadium (V), niobium (Nb), tantalum (Ta), molybdenum (Mo), tungsten (W), nickel (Ni) and cobalt (Co), O is oxygen, and H is hydrogen.

5. The process according to claim 1, in which the polyoxometallates are selected from the group consisting of the polyoxometallates of formula $PVMo_{11}O_{40}^{4-}$, $PV_2Mo_{10}O_{40}^{5-}$, $PV_3Mo_9O_{40}^{6-}$, $PV_4Mo_8O_{40}^{7-}$, $HPNiMo_{11}O_{40}^{6-}$, $P_2Mo_5O_{23}^{6-}$, $Ni_2Mo_{10}O_{38}H_4^{8-}$, $NiMo_6O_{24}H_6^{4-}$, $PMo_{12}O_{40}^{3-}$, $PW_{12}O_{40}^{3-}$, $PMo_3W_9O_{40}^{3-}$ and $PMo_6W_6O_{40}^{3-}$, or a mixture thereof.

6. The process according to claim 1, in which the at least one polyoxometallate is a Keggin heteropolyanion of formula $XM_{12}O_{40}^{q-}$ or a lacunary Keggin heteropolyanion of formula $XM_{11}O_{39}^{q-}$, wherein X is an element selected from the group consisting of phosphorus (P), silicon, (Si), boron (B), nickel (Ni), and cobalt (Co), said element being alone, M is one or more element(s) selected from the group consisting of vanadium (V), niobium (Nb), tantalum (Ta), molybdenum (Mo), tungsten (W), nickel (Ni), and cobalt (Co), O is oxygen, and q is an integer between 1 and 20.

7. The process according to claim 1, in which the at least one polyoxometallate is selected from the group consisting of heteropolyanions of formula $PW_{12}O_{40}^{3-}$ and $PMo_3W_9O_{40}^{3-}$, or a mixture thereof.

8. The process according to claim 1, in which the catalyst comprises a total content by weight of group VIB element expressed in percentage by weight of oxide relative to the total weight of the catalyst between 2 and 35% by weight.

9. The process according to claim 1, in which the catalyst comprises a content by weight of the group VIII element expressed in percentage by weight of oxide relative to the total weight of the catalyst between 0.1 and 10% by weight.

10. The process according to claim 1, in which the catalyst comprises a content by weight of doping element selected from the group consisting of phosphorus, boron and silicon expressed in percentage by weight of oxide relative to the total weight of the catalyst between 0.1 and 10% by weight.

11. The process according to claim 1, in which said mesostructured matrix contains a mixture of silicon oxide and aluminium oxide.

12. The process according to claim 1, in which said catalyst has, in its oxide form, a non-spherical shape of each of the elementary particles of which it is constituted.

13. The process according to claim 1, in which a preliminary step of hydrotreating or of hydrorefining of said hydrocarbon-containing feedstock is applied in said hydrocracking process upstream of at least one hydrocracking catalyst.

14. The process according to claim 1, which takes place at a temperature above 200° C., at a pressure above 1 MPa, the space velocity being between 0.1 and 20 $h^{-1}$, and the quantity of hydrogen introduced is such that the volume ratio liter of hydrogen/liter of hydrocarbon is between 80 and 5000 l/l.

15. The process according to claim 1, which takes place at a temperature above 200° C., at a pressure above 1 MPa, the space velocity being between 0.1 and 6 $h^{-1}$, and the quantity of hydrogen introduced is such that the volume ratio liter of hydrogen/liter of hydrocarbon is between 80 and 5000 l/l.

16. A process for hydrocracking at least one hydrocarbon-containing feedstock, in which at least 50% by weight of the compounds boil between 340° C. and 540° C., by a catalyst comprising, in its oxide form, at least one metal selected from the group consisting of the metals of group VIB, the metals of group VIII and the metals of group VB of the periodic table, alone or in a mixture, said metals being present in the form of at least one polyoxometallate that is a Keggin heteropolyanion of formula $XM_{12}O_{40}^{q-}$ for which the m/x ratio is equal to 12 or a lacunary Keggin heteropolyanion of formula $XM_{11}O_{39}^{q-}$ for which the m/x ratio is equal to 11, wherein X is an element selected from the group consisting of phosphorus (P), silicon (Si), boron (B), nickel (Ni) and cobalt (Co), said element being alone, M is one or more element(s) selected from the group consisting of vanadium (V), niobium (Nb), tantalum (Ta), molybdenum (Mo), tungsten (W), nickel (Ni) and cobalt (Co), O is oxygen, and q is an integer between 1 and 20, said polyoxometallates being present within a mesostructured matrix based on oxide of at least one element Y selected from the group consisting of silicon, aluminium, titanium, zirconium, gallium, and cerium and a mixture of at least one of these elements, said matrix having a pore size between 1.5 and 50 nm and having amorphous walls of thickness between 1 and 30 nm, said catalyst having been sulphurized.

17. The process according to claim 16, in which said feedstock is a vacuum distillate cut.

18. A process for hydrocracking at least one hydrocarbon-containing feedstock, in which at least 50% by weight of the compounds boil between 340° C. and 540° C., by a catalyst comprising, in its oxide form, at least one metal selected from the group consisting of the metals of group VIB, the metals of group VIII and the metals of group VB of the periodic table, alone or in a mixture, said metals being present in the form of at least one polyoxometallate that is a Keggin heteropolyanion of formula $PW_{12}O_{40}^{3-}$ or $PMo_3W_9O_{40}^{3-}$ or a mixture thereof, said polyoxometallates being present within a mesostructured matrix based on oxide of at least one element Y selected from the group consisting of silicon, aluminium, titanium, zirconium, gallium, and cerium and a mixture of at least one of these elements, said matrix having a pore size between 1.5 and 50 nm and having amorphous walls of thickness between 1 and 30 nm, said catalyst having been sulphurized.

19. The process according to claim 18, in which said feedstock is a vacuum distillate cut.

* * * * *